(12) United States Patent
Asano

(10) Patent No.: US 7,426,434 B2
(45) Date of Patent: Sep. 16, 2008

(54) ENGINE CONTROLLER WITH AN ATMOSPHERIC PRESSURE CORRECTION FUNCTION

(75) Inventor: Seiji Asano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/802,549

(22) Filed: May 23, 2007

(65) Prior Publication Data
US 2007/0276579 A1 Nov. 29, 2007

(30) Foreign Application Priority Data
May 24, 2006 (JP) ............... 2006-144363

(51) Int. Cl.
*G06F 17/00* (2006.01)
*F02B 73/00* (2006.01)
(52) U.S. Cl. ........................... 701/109; 477/39
(58) Field of Classification Search ............... 701/103, 701/109, 110, 112, 67; 180/65.1–65.3; 477/39, 477/121; 60/716; 123/322, 437, 438
See application file for complete search history.

(56) References Cited

U.S. PATENT DOCUMENTS

| | | | | |
|---|---|---|---|---|
| 5,577,812 A | * | 11/1996 | Hirano et al. ............... 303/112 |
| 6,055,476 A | * | 4/2000 | Yoshino ...................... 701/110 |
| 6,278,933 B1 | * | 8/2001 | Buckland et al. ............ 701/104 |
| 6,324,461 B1 | * | 11/2001 | Yamaguchi et al. ........... 701/80 |
| 6,377,885 B2 | * | 4/2002 | Yasui et al. .................... 701/80 |
| 6,430,515 B1 | | 8/2002 | Sanyal et al. |
| 7,184,879 B1 | * | 2/2007 | Lewis .......................... 701/112 |
| 7,353,106 B2 | * | 4/2008 | Kolmanovsky et al. ..... 701/112 |
| 2002/0108794 A1 | | 8/2002 | Wakashiro et al. |

FOREIGN PATENT DOCUMENTS

| EP | 1 447 551 A1 | 8/2004 |
|---|---|---|
| JP | 2001-122092 A | 5/2001 |

OTHER PUBLICATIONS

European Search Report dated Aug. 21, 2007 (five (5) pages).

* cited by examiner

*Primary Examiner*—Willis R. Wolfe, Jr.
*Assistant Examiner*—Johnny H. Hoang
(74) *Attorney, Agent, or Firm*—Crowell & Moring LLP

(57) ABSTRACT

An engine controller of the present invention is comprised of: a determining section for determining a state where an engine is not driven; a braking torque obtaining section for obtaining a braking toque acting on the vehicle; a vehicle speed sensing section for sensing a vehicle speed; an atmospheric pressure obtaining section for obtaining an atmospheric pressure value when an engine is driven; a road gradient obtaining section for obtaining a road gradient on the basis of the braking torque and the vehicle speed when the determining section determines the state where the vehicle is not driven; an atmospheric pressure correcting section which calculates a vehicle vertical travel of a downhill on the basis of the road gradient and a travel distance derived from the vehicle speed when the vehicle has descended the downhill, and corrects the atmospheric pressure value on the basis of the vehicle vertical travel of the downhill.

11 Claims, 25 Drawing Sheets

△ : OCCURRENCE OF INTERVAL EVERY PREDETERMINED DISTANCE

▲ : OCCURRENCE OF INTERVAL EVERY PREDETERMINED TIME

ENGINE CONTROLLER WITH AN ATMOSPHERIC PRESSURE CORRECTION FUNCTION

CLAIM OF PRIORITY

The present application claims priority from Japanese application serial no. 2006-144363, filed on May 24, 2006, the contents of which are hereby incorporated by references into this application.

FIELD OF THE INVENTION

The present invention relates to an engine controller for a vehicle such as an automobile car and, more particularly, to an engine controller capable of executing demand torque control that controls an electronic control throttle in accordance with a demand torque.

BACKGROUND ART

A system for estimating a long downhill run in a car of one's own is disclosed in Japanese laid-open Patent Publication No. 2001-122092. The system estimates that the car is running just now on a long downhill when the following accumulated count value reaches a preset value. The accumulated count value is obtained by the following way using computing means: adding a weighting factor to time in which an exhaust brake or a retarder is operated in an "on" state and accumulating the resultant time as accumulated braking time; on the other hand, adding a weighting factor to time in which an accelerator pedal is operated and accumulating the resultant time as accumulated accelerating time; and obtaining the accumulated count value by subtracting from the accumulated braking time to the accumulated accelerating time. The above-mentioned prior art is system for estimating whether the road on car's running is a downhill or not but does not obtain a downhill gradient of the road.

When a car with an engine controller having no atmospheric pressure sensor descends a long downhill, fuel cut is continuously performed, and a throttle is usually in a fully closed state, but the atmospheric pressure value cannot be updated. In this case, when controlling an electronic control throttle valve in accordance with the balance on torques of a demand torque based on an accelerator pedal position and a motor generator torque or the like, the atmospheric pressure value is remained at high altitude. Therefore, when the fuel cut is reset to fuel supply by a driver's accelerator pedal operation after a downhill running of the car is fished, the throttle position is slightly wider than the true throttle position. Consequently, until the atmospheric pressure value is updated again by a tune-up on lowland, acceleration is excessive with respect to the accelerator position operated by the driver, so that drivability deteriorates.

SUMMARY OF THE INVENTION

An object of the invention is to improve drivability after car's downhill running. The object is realized by: obtaining vehicle vertical travel of a downhill after car's downhill running from a braking torque acting on the car and a car speed; correcting a beforehand atmospheric pressure value on the basis of the vehicle vertical travel of the downhill to have a good grasp of the atmospheric pressure at a position after car's downhill running; and optimizing the position of a control throttle valve in accordance with the corrected atmospheric pressure.

To achieve the object, an engine controller of the invention is comprised of:

a determining section for determining a state where an engine is not driven;

a braking torque obtaining section for obtaining a braking toque acting on the vehicle;

a vehicle speed sensing section for sensing a vehicle speed;

an atmospheric pressure obtaining section for obtaining an atmospheric pressure value when an engine is driven, a road gradient obtaining section for obtaining a road gradient on the basis of the braking torque and the vehicle speed when the determining section determines the state where the vehicle is not driven;

an atmospheric pressure correcting section which calculates a vehicle vertical travel of a downhill on the basis of the road gradient and a travel distance derived from the vehicle speed when the vehicle has descended the downhill, and corrects the atmospheric pressure value on the basis of the vehicle vertical travel of the downhill.

When a vehicle runs on a long downhill, fuel is continuously cut on the long downhill and the vehicle is not driven by the driving force from the engine but is driven by an inertial force according to the gradient of the downhill. Consequently, the gradient of the downhill can be obtained by computation on the basis of the braking torque acting on the vehicle and the vehicle speed. And the vehicle vertical travel of a downhill is obtained from the downhill gradient obtained by the computation and a travel distance of the vehicle which has descended the downhill. Since the more the vehicle descends on the downhill, the atmospheric pressure increases, the atmospheric pressure can be estimated from the vehicle vertical travel of the downhill at time when the vehicle has descended the long downhill.

According to the invention, when the determining section determines the state where the vehicle is not driven, the braking torque obtaining section obtains the braking torque acting on the vehicle, the road gradient determining section obtains a road gradient on the basis of the obtained braking torque and the vehicle speed sensed by the vehicle speed sensing section. The vehicle vertical travel of the downhill is calculated on the basis of the obtained road gradient and the travel distance, and the atmospheric pressure value obtained by the atmospheric pressure obtaining sections is corrected with the atmospheric correction value according to a vehicle vertical travel of a downhill. Thereby the atmospheric pressure in a position after the vehicle has descended the downhill is obtained. Consequently, in an engine controller having no atmospheric pressure sensor, the atmospheric pressure used for controlling the electronic control throttle valve can be set to that in a low land. After the vehicle has descended the downhill and reaches a low land, when the driver resets the fuel cut to fuel supply by an accelerator operation, the electronic control throttle valve is controlled to a proper position according to the accelerator operation of the driver. Thus, the drivability can be improved.

In the engine controller of the invention, the atmospheric pressure obtaining section may obtain the atmospheric pressure on the basis of a pressure value within an intake pipe when pressures between upstream and downstream of a throttle valve in the intake pipe become the same. When the engine is driven, the atmospheric pressure value can be obtained by the intake pipe pressure sensor provided in the intake pipe.

In the engine controller of the invention, in the case of a vehicle is driven only by an internal combustion engine, the determining section may determine the state where the vehicle is not driven, by a fuel stop instruction to the engine.

As a result, it is determined that the vehicle descends a downhill without being driven by the engine.

In the engine controller according to the invention, in the case of a vehicle is driven by an internal combustion engine and an electric motor, the determining section may determine the state where the vehicle is not driven, by a fuel stop instruction to the engine and an output stop instruction to the electric motor. It is consequently determined that the hybrid vehicle descends a downhill without being driven by the engine.

In the engine controller according to the invention, the braking torque obtaining section may obtain the braking torque acting on the vehicle by an ON signal to a brake. A major part of the braking toque acting on the vehicle is braking torque of the brake. Consequently, when the brake is operated by the ON/OFF signal, the braking torque acting on the vehicle is obtained by integrating the time of the ON signal of the brake.

In the engine controller according to the invention, the braking torque obtaining section may obtain the braking torque acting on the vehicle by mechanical force acting on a brake.

Further, in a preferred embodiment, in the engine controller according to the invention, the braking torque obtaining section may obtain the braking torque acting on the vehicle by any of a combination of the quantity of power generated by a generator, an air conditioner compressor load, and an external load. Thereby the braking torque acting on the vehicle can be obtained more accurately.

Further, in the engine controller according to the invention, inter-relations among an average vehicle speed, the braking torque, and the road gradient may be predetermined; and the road gradient obtaining section may obtain a road gradient in relation to the braking torque obtained by the braking torque obtaining section and the average vehicle speed obtained by the vehicle speed sensing section.

Further, in the engine controller according to the invention, a plurality of inter-relations between the braking torque and the road gradient may be predetermined at different average vehicle speeds. The road gradient obtaining section may select one of the inter-relations between the braking torque and the road gradient in accordance with an average value of the vehicle speeds obtained by the vehicle speed sensing section, and obtain road gradient from the braking torque obtained by the braking torque obtaining section, on the basis of the selected inter-relations.

Further, in the engine controller according to the invention, the atmospheric pressure correcting section may have a function for obtaining a correction value for atmospheric pressure in a nonlinear form, in accordance with the calculated downhill altitude of the vehicle. Thus, the atmospheric pressure after the downhill running of the vehicle can be obtained accurately.

Further, in the engine controller according to the invention, the atmospheric pressure correcting section has a function for obtaining a correction value for atmospheric pressure in a linear form, in accordance with the calculated vehicle vertical travel of the downhill. Thus, the atmospheric pressure after the downhill running of the vehicle can be obtained accurately.

DETAILED DESCRIPTION OF THE PREFERRED EMBODIMENTS

Figure 1:
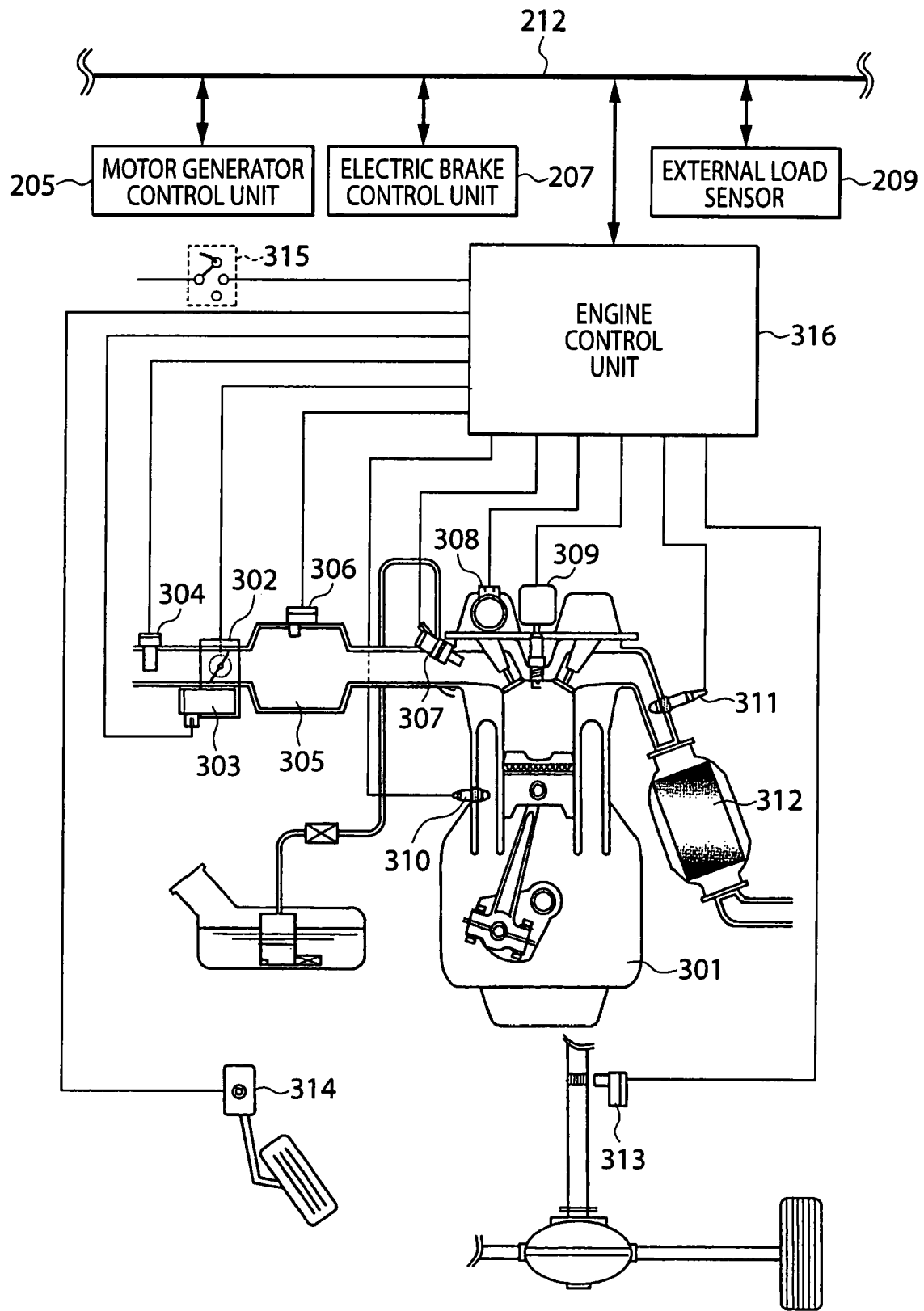
FIG. 1 is a diagram showing the configuration of an engine system having an engine controller of an embodiment of the invention.

An embodiment of an engine controller of the present invention will be described below with reference to the drawings. FIG. 1 is a diagram showing the configuration of an engine system having the engine controller of the embodiment of the invention.

An engine 301 has, for example, four cylinders. In an intake pipe 305 for feeding air into the cylinders, an electronic control throttle valve 302 for controlling an intake air rate on the basis of an accelerator position, a mass air flow sensor 304 for sensing a flow rate of air taken in the engine, and an intake pipe pressure sensor 306 for sensing the pressure in the intake pipe 305 are disposed in proper positions respectively. A throttle position sensor 303 for sensing the throttle position is provided for the electronic control throttle valve 302.

The air subjected to flow rate control by the electronic control throttle valve 302 is mixed with fuel injected from a fuel injection valve 307 disposed on the upstream side of the cylinders. The mixture is supplied to each of the cylinders and burnt.

Emissions of the fuel burnt in the cylinders are led to a catalyst 312 through an exhaust pipe and cleaned-up, and the resultant emissions are exhausted. In the exhaust pipe, an oxygen sensor 311 for sensing the oxygen concentration in the exhaust gas is disposed in a proper position. Further, a crank angle sensor 308, an ignition module 309, and a water temperature sensor 310 are disposed in proper positions in the engine 301. The crank angle sensor 308 is one of means for sensing the engine speed and disposed in a predetermined crank angle position of the engine. The ignition module 309 supplies ignition energy to each of spark plugs, in accordance with an ignition signal of an engine control unit 316, to ignite the fuel mixture supplied into each of the cylinders of the engine. The water temperature sensor 310 senses the temperature of cooling water of the engine. The accelerator pedal is provided with an accelerator pedal sensor 314 for sensing the accelerator position. A propeller shaft of the drive system of the vehicle is provided with a vehicle speed sensor 313 for producing a signal according to speed.

Figure 3:
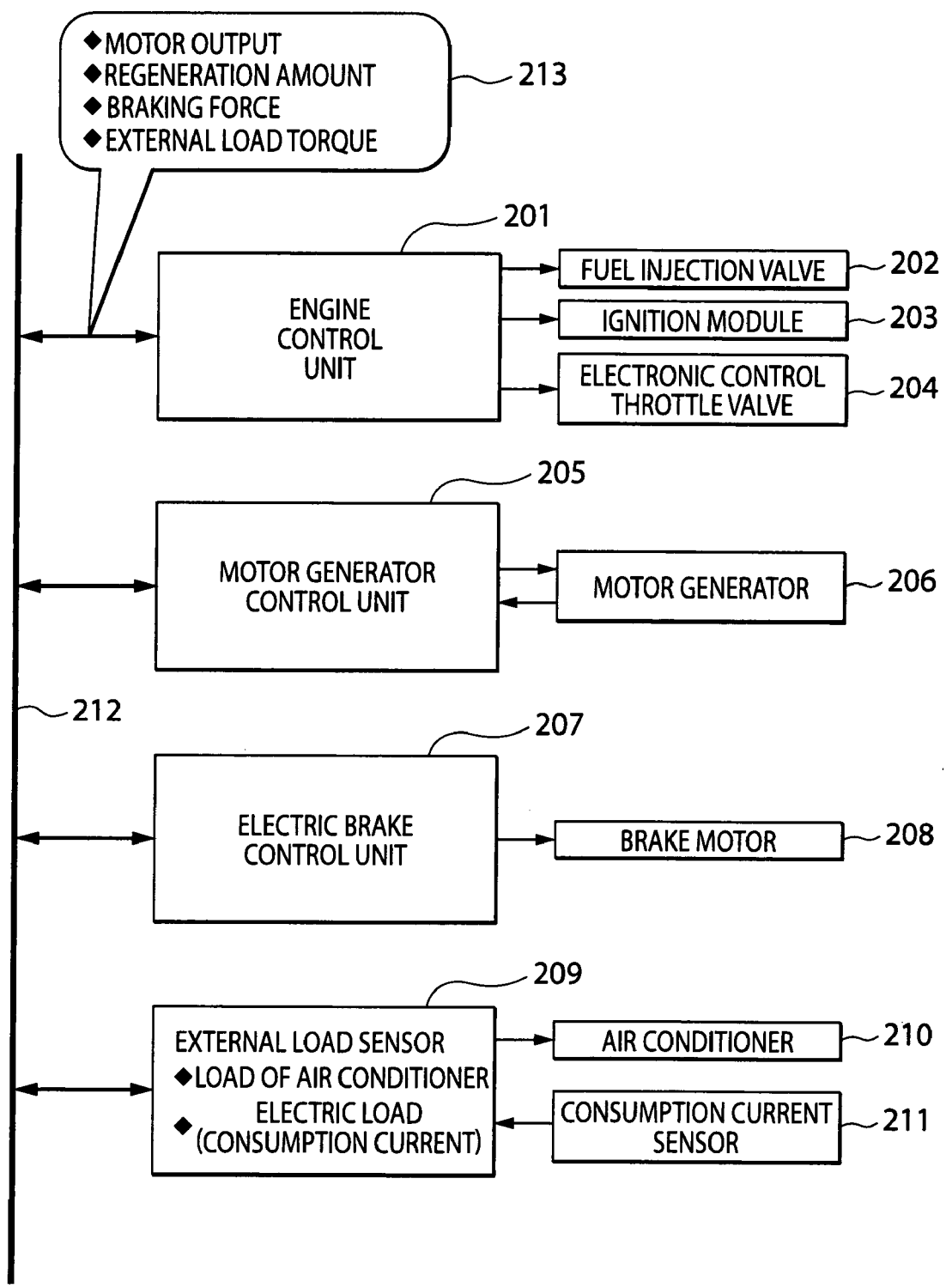
FIG. 3 is a diagram showing control blocks of the engine controller in a hybrid vehicle of the embodiment.

The respective signals from the throttle position sensor 303, the mass air flow sensor 304, the intake pipe pressure sensor 306, the water temperature sensor 310, the oxygen sensor 311, the accelerator pedal sensor 314, the crank angle sensor 308, and the like and an output of an ignition key switch 315 as a main switch for driving/stopping the engine are taken in to the engine control unit 316. In the case of a hybrid vehicle, as also shown in FIG. 3 which will be described later, a communication line 212 is set above the engine control unit 316. The engine control unit 316 can transmits/receives data to/from a motor-generator control unit 205, an electric brake control unit 207, and an external load sensor 209 through the communication line 212.

Figure 2:
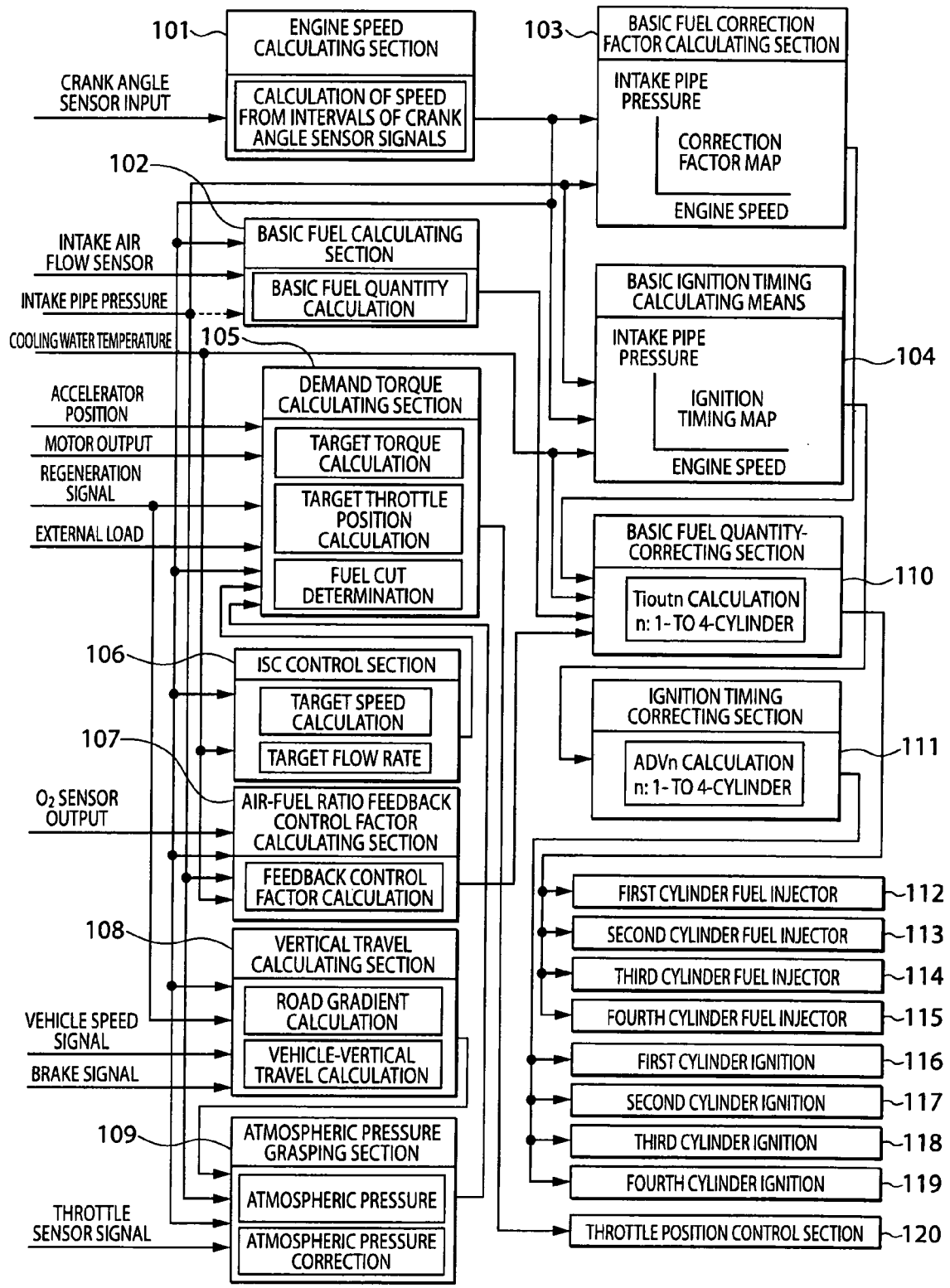
FIG. 2 is a diagram showing control blocks of the engine controller of the embodiment.

FIG. 2 is a control block diagram of the engine control unit 316 having a road gradient calculating section.

A engine speed calculating section 101 calculates engine speed per unit time by counting the number of inputs per unit time in an electric signal, mainly, in a pulse signal of the crank angle sensor 308 and performing arithmetic process, and outputs the calculated engine speed to a basic fuel quantity calculating section 102, a basic fuel quantity-correction factor calculating section 103, a basic ignition timing calculating section 104, and the like.

The basic fuel quantity calculating section 102 calculates a basic fuel injection quantity for the internal combustion engine 301 in operation areas on the basis of the engine speed calculated by the engine speed calculating section 101 and a mass air flow rate measured by the mass air flow sensor 304 mounted in the intake pipe 305, and outputs the basic fuel injection quantity to a fuel quantity correcting section 110. In the case of an L-jetronic engine, the intake air flow rate is used for the basic fuel quantity calculation as described above. On the other hand, in the case of a D-jetronic engine, as shown by a broken line in the diagram, an intake pipe pressure sensed by the pressure sensor is used of the basic fuel quantity calculation in place of an air flow rate.

The basic fuel quantity-correction factor calculating section 103 obtains a correction factor for the basic fuel injection quantity in each of the engine operation areas by searching a map in relation to the engine speed calculated by the engine speed calculating section 101 and the intake pipe pressure (namely a pressure value within the intake pipe) from the intake pipe pressure sensor 306, and outputs the correction factor to the fuel quantity correcting section 110. In place of the intake pipe pressure, the basic fuel quantity may be used as an engine load index for a map search.

The basic ignition timing calculating section 104 obtains the optimum ignition timing in each of the engine operation areas by a map search or the like on the basis of the output signals from the engine speed calculating section 101, the intake pipe pressure sensor 306, and the water temperature sensor 310, and outputs the optimum ignition timing to the ignition timing correcting section 111.

A demand torque calculating section 105 calculates a demand target torque and calculates a target valve position for the electronic control throttle valve 302 so that an output of the engine reaches the target torque, and outputs the target valve position to a throttle position control section 120. The throttle position control section 120 controls the throttle position of the electronic control throttle valve 302 in accordance with a signal of the target valve position. In the case of a normal vehicle, the target torque is computed on the basis of an accelerator position and an engine load (intake air volume). In the case of a hybrid vehicle having a motor generator or the like, an output of the motor generator, an external load, a regeneration signal, and the like are also taken in to the demand torque computing means 105. In the embodiment, determination of fuel cut is also performed in addition to the target torque computation.

ISC control section 106 sets a target engine speed at the time of idling on the basis of the engine speed calculated by the engine speed calculating section 101 and the cooling water temperature such that idling engine speed of the engine is maintained to be constant, and calculates a target flow rate of air passing through an ISC valve such that the engine rotates at the set target engine speed. The calculated target flow rate is sent to the demand torque calculating section 105 and the throttle position is operated to obtain a part of the target toque on basis of the calculated target flow rate.

An air-fuel ratio feedback control factor-calculating section 107 calculates an air-fuel ratio feedback control factor such that the mixture of the fuel and air supplied to the engine 301 is maintained at a target air-fuel ratio, on the basis of the engine speed calculated by the engine speed calculating section 101, the signal from the oxygen sensor 311, an engine load (intake air flow rate), and an engine cooling water temperature from the water temperature sensor 310; and the section 107 outputs the calculated air-fuel ratio feedback control factor to the fuel quantity correcting section 110.

A vehicle vertical travel calculating section 108 calculates a vehicle vertical travel of a downhill when a car (vehicle) of one's own descended the downhill. In advance of the calculation of the vehicle vertical travel of the downhill, the vehicle vertical travel calculating section 108 calculates a road gradient on the basis of the vehicle speed and the braking force acting on the car. After that, the section 108 calculates the vehicle vertical travel of a downhill on the basis of the calculated road gradient. In a manner similar to the demand torque calculating section 105, in the case of a hybrid automobile car having a motor generator, a regeneration signal is also taken in to the vehicle vertical travel calculating section 108 to use for calculation of the vehicle vertical travel of a downhill.

An atmospheric pressure grasping section 109 takes in an atmospheric value on the basis of the intake pipe pressure sensed by the intake pipe pressure sensor 306. The section 109 calculates an atmospheric pressure correction value on the basis of the vehicle vertical travel of a downhill calculated by the calculating section 108, and corrects the atmospheric pressure value with the correction value. Thereby the section 109 can grasp the atmospheric pressure at a descent point where the car has just finished descending the downhill.

The fuel quantity correcting section 110 corrects the basic fuel injection quantity calculated by the basic fuel calculating section 102 on the basis of the correction factor of the basic fuel correction factor calculating section 103, the air-fuel ratio feedback control factor of the air-fuel ratio feedback control factor calculating section 107, and the output signal of the water temperature sensor 310. A finally determined fuel injection quantity is output for a first cylinder-fuel injector 112, a second cylinder-fuel injector 113, a third cylinder-fuel injector 114, and a fourth cylinder-fuel injector 115.

The ignition timing correcting section 111 corrects the ignition timing retrieved from a map by the basic ignition timing calculating section 104 in accordance with the state (transient or steady state) of the engine. And the section 111 outputs the corrected ignition timing for a first cylinder-ignition 116, a second cylinder-ignition 117, a third cylinder-ignition 118, and a fourth cylinder-ignition 119.

FIG. 3 is a control block diagram of an engine control unit in a hybrid automobile car having a motor generator. An engine control unit 201 controls the engine such that a demand torque is output by controlling a fuel injection valve (injector) 202, an ignition module 203, and an electronic control throttle valve 204. The motor-generator control unit 205 controls a motor-generator 206. In the embodiment, the electric brake control unit 207 is also provided to control a brake motor 208 for operating an electric brake. The external load sensor 209 is provided with a consumption current sensor 211 for sensing consumption of an air conditioner 210, headlamps, and the like. The load of the air conditioner 210 and the electric load consumed by the headlamps and the like are detected. The control units 201, 205, and 207 and the external load sensor 209 are disposed under the communication line 212. The engine control unit 201 can obtain a motor output, a generation/regeneration quantity, a braking force, and an external load torque from the communication line 212.

Figure 4:
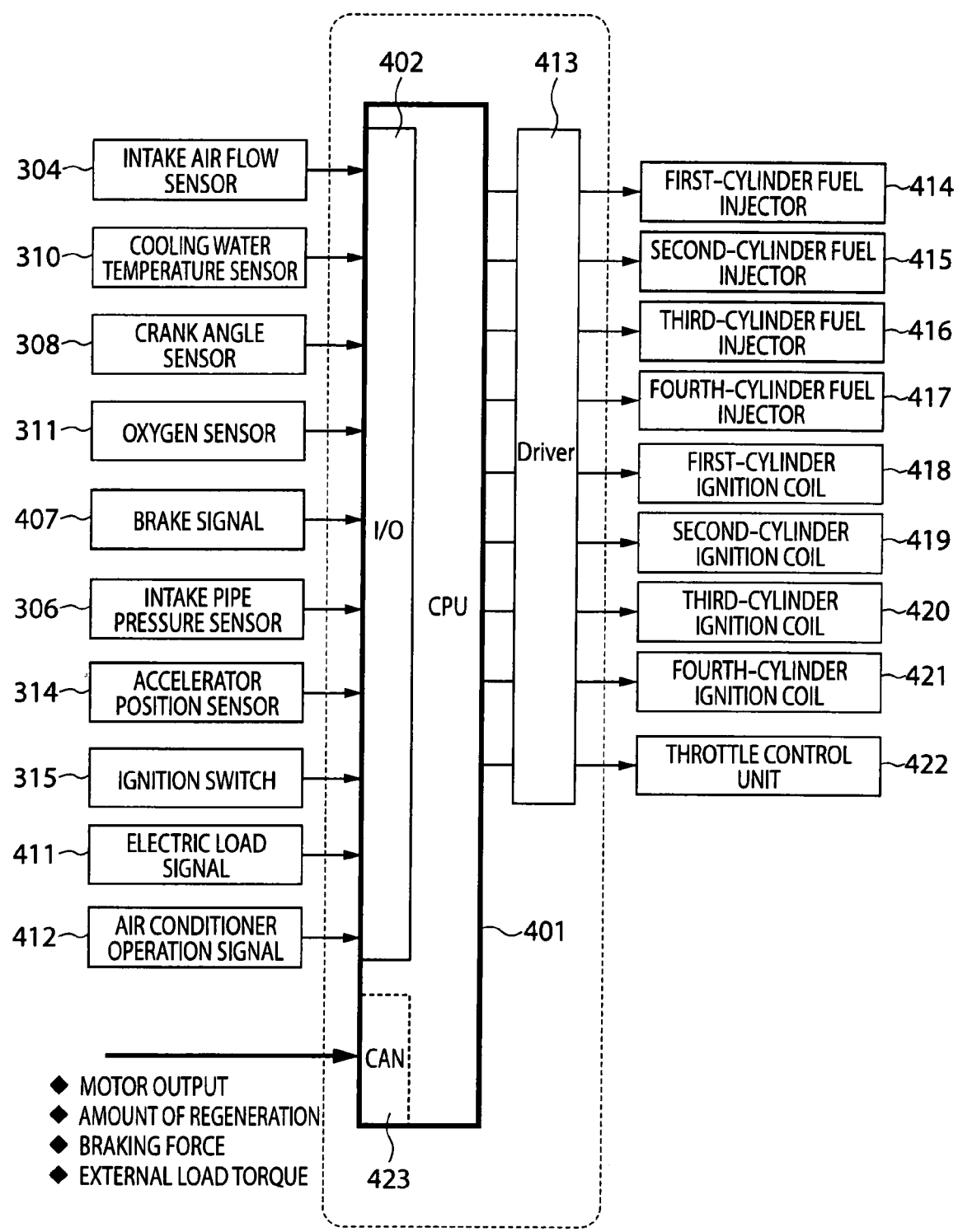
FIG. 4 is a diagram showing an internal configuration of the engine controller of the embodiment.

FIG. 4 is a diagram showing an internal configuration of the engine control unit 316 having the road gradient calculating section. A CPU 401 has therein an I/O unit 402 for converting electric signals from the sensors provided for the engine to signals for digital arithmetic process and converting a control signal for digital arithmetic process to an actual drive signal for an actuator. The I/O unit 402 takes in signals from the mass air flow sensor 304, a cooling water temperature sensor 310, a crank angle sensor 308, an oxygen sensor 311, a brake signal 307, the intake pipe pressure sensor 306, the accelerator pedal position sensor 314, the ignition switch 315, an electric load signal 411, and an air conditioner operation signal 412. Output signals from the CPU 401 are output via a driver 413 for a first to fourth cylinder-fuel injection valves 414 to 417, a first to fourth cylinder-ignition coils 418 to 421, and a throttle control unit 422. The I/O unit 402 takes in a braking force as the brake signal 407 in the case where an electric brake is provided, or takes in a brake on/off signal in the case where an electric brake is not provided. A CAN 423 as a communication system is set in the CPU 401. A motor output, a regeneration quantity, braking force, and an external load torque can be also intake in to the CPU 401 via an external communication line and the CAN 423.

Figure 5:
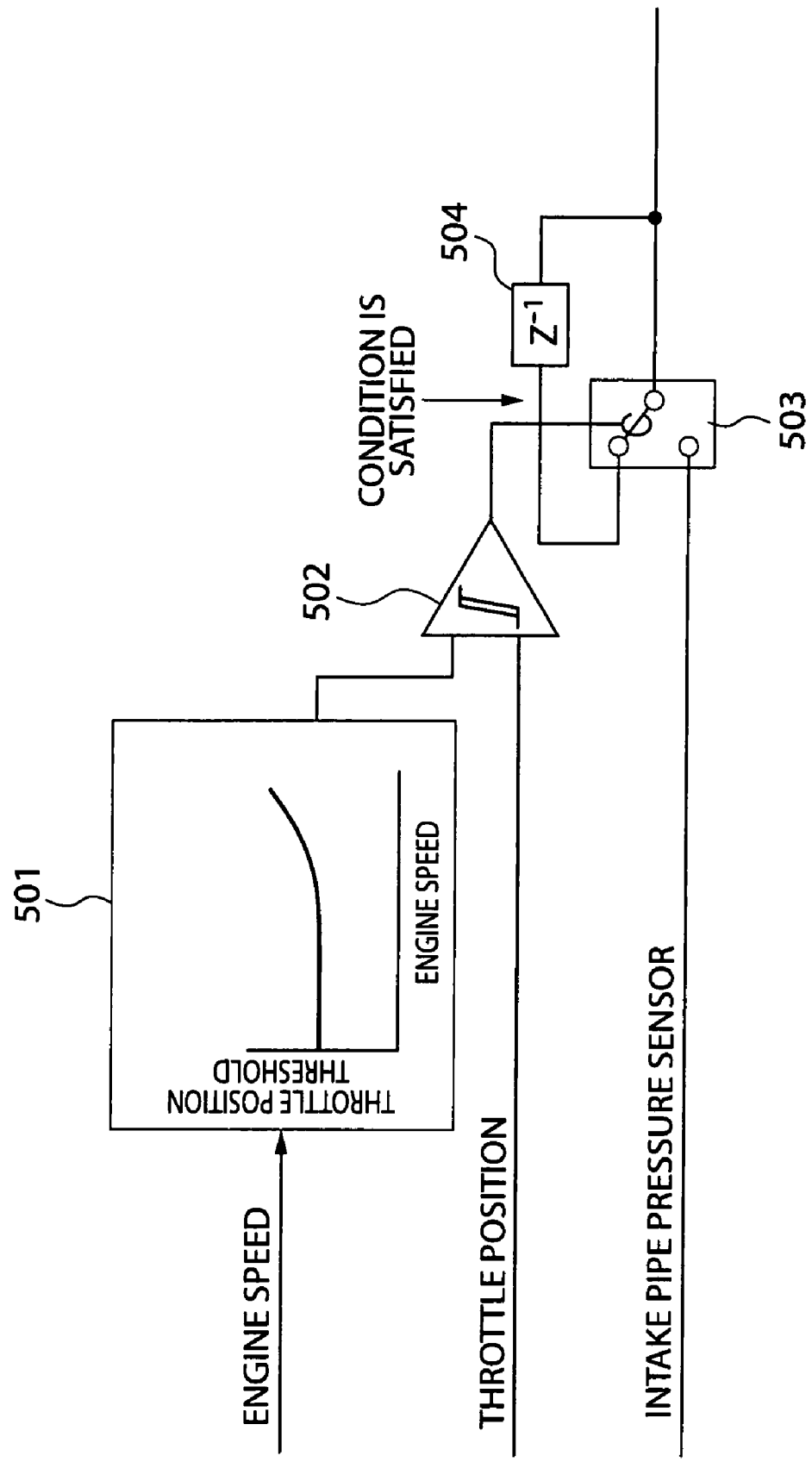
FIG. 5 is a detailed block configuration diagram of atmospheric pressure obtaining means of the engine controller of the embodiment.

FIG. 5 is a diagram showing an example of a detailed block configuration of the atmospheric pressure grasping section 109. A Map 501 therein shows the relation between engine speed and throttle position threshold. A throttle position threshold is retrieved by searching the map 501 in relation to the engine speed, and is output to a comparator 502. The comparator 502 compares the throttle position threshold with the throttle position of the electronic control throttle valve 302. When the throttle position is larger than the throttle position threshold, the intake pipe pressure sensed by the intake pipe pressure sensor 306 is taken in to the section 109 as an atmospheric pressure value. The atmospheric pressure value is held by a holding device comprised of a switch 503 and a delay unit 504.

Figure 6:
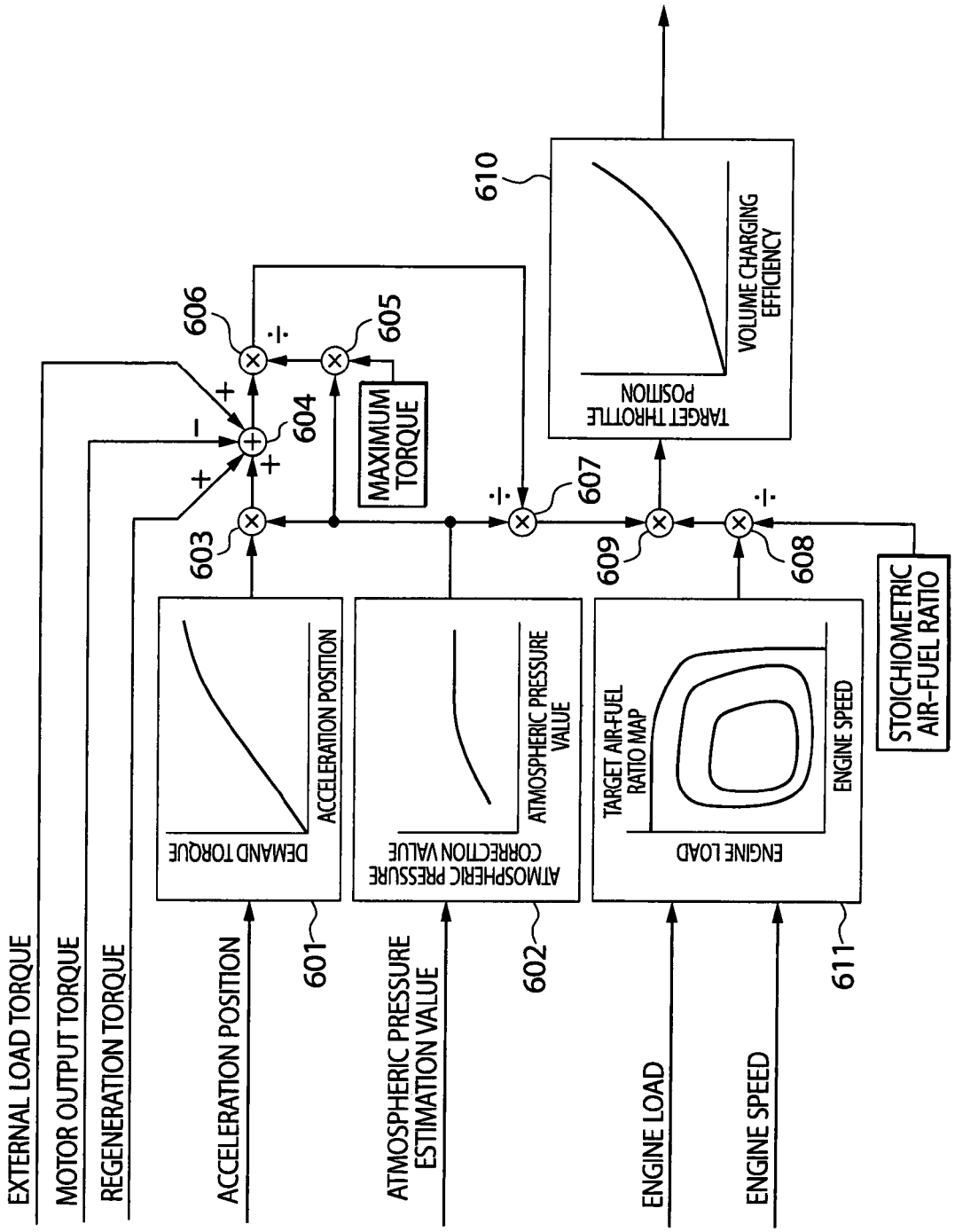
FIG. 6 is a block configuration diagram showing demand torque computing means and computation of target position of an electronic control throttle in the engine controller of the embodiment.

FIG. 6 is a diagram showing an example of a detailed block configuration of the demand torque calculating section 105. The demand torque calculating section 105 calculates the demand torque and determines target position of the electronic control throttle valve 302 from the demand torque.

A table block 601 shows the relation between the accelerator position and the demand torque. The demand torque is retrieved by searching a map of the table block 601 in accordance with the accelerator position. The retrieved demand torque is output to a multiplier 603. A table block 602 shows the relation between an atmospheric pressure value obtained by the atmospheric pressure grasping section 109 and an atmospheric pressure correction value. An atmospheric pressure correction value is retrieved by a map of the table block 602 on the basis of the atmospheric pressure value, and output to a multiplier 603. In the multiplier 603, the demand torque is subjected to atmospheric pressure correction.

In the case of a hybrid vehicle, a regeneration torque and an external load torque are added to the demand torque by an adder 604. A motor output torque is subtracted from the resultant torque, thereby calculating a total torque requested to the engine. After that, volume charging efficiency for the maximum torque (the ratio for the maximum torque) is obtained in a multiplier 606. In this case, since the maximum torque is influenced by the atmospheric pressure, the atmospheric pressure correction is made on the maximum torque in a multiplier 605.

A table block 611 shows the relation among the engine speed, engine load, and target air-fuel ratio. A target air-fuel ratio is retrieved by searching a map of the table block 611 in relation to the engine speed and the engine load and output to a multiplier 608. The multiplier 608 calculates the ratio between the retrieved target air-fuel ratio and a stoichiometric air-fuel ratio.

The volume charging efficiency obtained by the multiplier 606 is subjected to atmospheric pressure correction with an atmospheric pressure correction value by a multiplier 607. The resultant is further subjected to air-fuel ratio correction in a multiplier 609, so that volume charging efficiency is obtained. A map 610 shows the relation between the volume charging efficiency and the target throttle position, the target throttle position is retrieved by searching the map 610 in relation to the volume charging efficiency, thereby determining the target throttle position.

Figure 7:
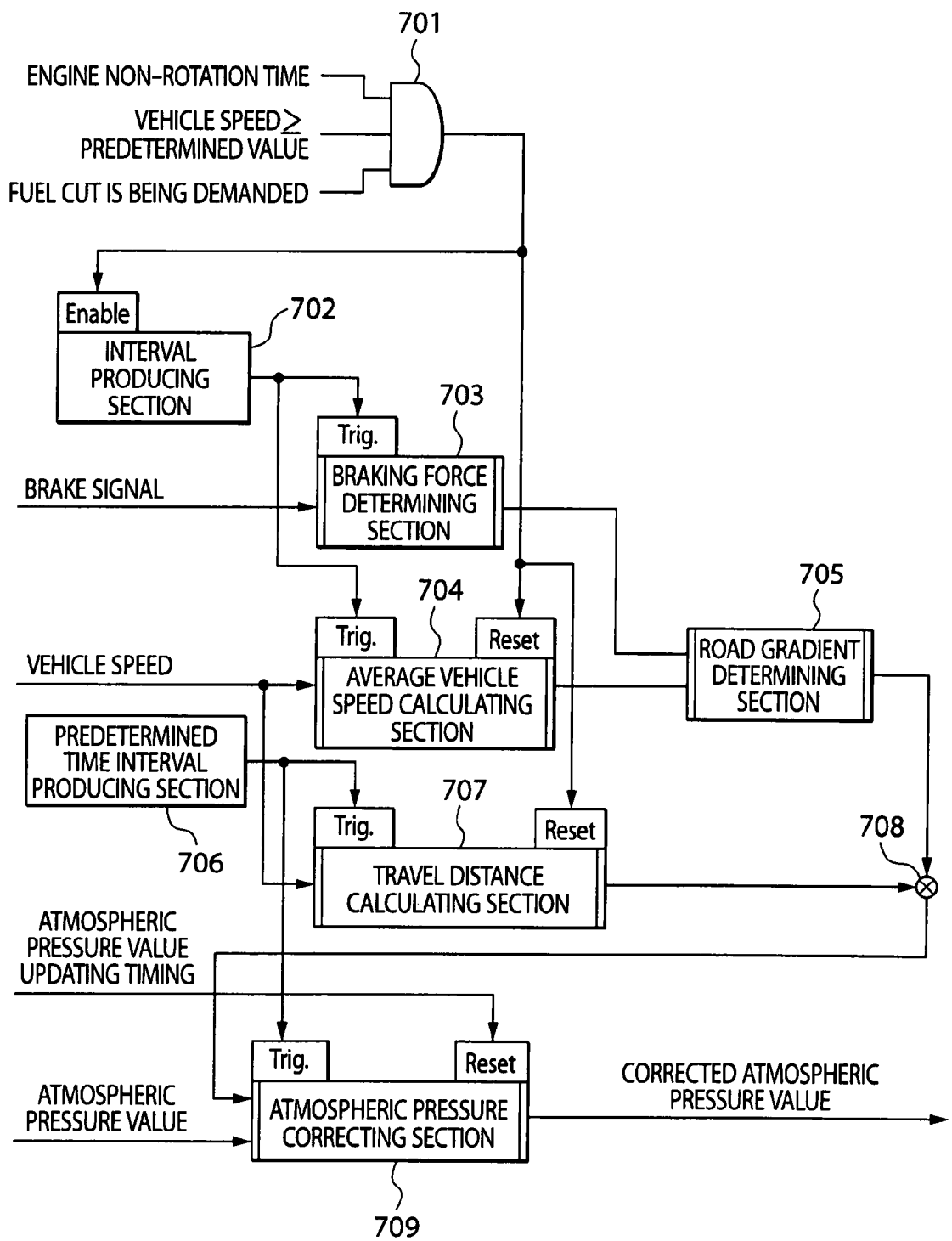
FIG. 7 is a block configuration diagram showing an example of road gradient computing means and atmospheric pressure correcting means of the engine controller of the embodiment.

FIG. 7 is a diagram showing an example of a detailed block configuration of the vehicle vertical travel calculating section 108 including the road gradient calculating section and the atmospheric pressure correcting section. The road gradient calculating section is comprised of a braking force determining section 703, an average vehicle speed calculating section 704, a road gradient determining section 705, and the like. A logic device 701 determines whether the automobile car is driven or not. Specifically, when the engine is not rotating and the car speed is equal to or higher than a predetermined value and a fuel cut is being required, it is determined that the car is not driven and is descending a downhill, and conditions for calculating descent gradient of the road by the road gradient calculating section are satisfied.

An interval producing section 702 generates a trigger every predetermined interval and outputting the generated trigger to the braking force determining section 703 and the average vehicle speed calculating section 704.

The braking force determining section 703 determines and integrates the braking force acting as braking torque on the vehicle, obtains an average value of the braking forces in a predetermined interval on the basis of the triggers from the interval generating section 702, and outputs the obtained average value of the braking forces to the road gradient determining section 705. The average vehicle speed calculating section 704 calculates an average vehicle speed in the predetermined interval on the basis of input vehicle speed and the trigger from the interval generating section 702.

A predetermined time-interval producing section 706 generates a trigger every predetermined time such as 10 ms and outputs the generated trigger to a travel distance calculating section 707 and an atmospheric pressure correcting section 709. The travel distance calculating section 707 obtains a distance of the car's travel in the predetermined interval on the basis of the vehicle speed and the triggers generated every predetermined time interval produced by the section 706.

The road gradient determining section 705 obtains the descent gradient of the road on the basis of the braking force determined in the braking force determining section 703 and the average vehicle speed calculated by the average vehicle speed calculating section 704. Since the descent gradient of the road obtained by the road gradient determining section 705 is a relatively small value, it can be approximated as sin θ=tan θ. Therefore, the vehicle vertical travel of a downhill where the car has descended the downhill in the predetermined interval can be obtained, by multiplying the descent gradient and the vehicle travel distance in the predetermined interval with a multiplier 708. The atmospheric pressure correcting section 709 obtains a correction value for the atmospheric pressure that increases according to the vehicle vertical travel of a downhill and thereby corrects the atmospheric pressure value obtained by the atmospheric pressure grasping section 109.

Figure 8:
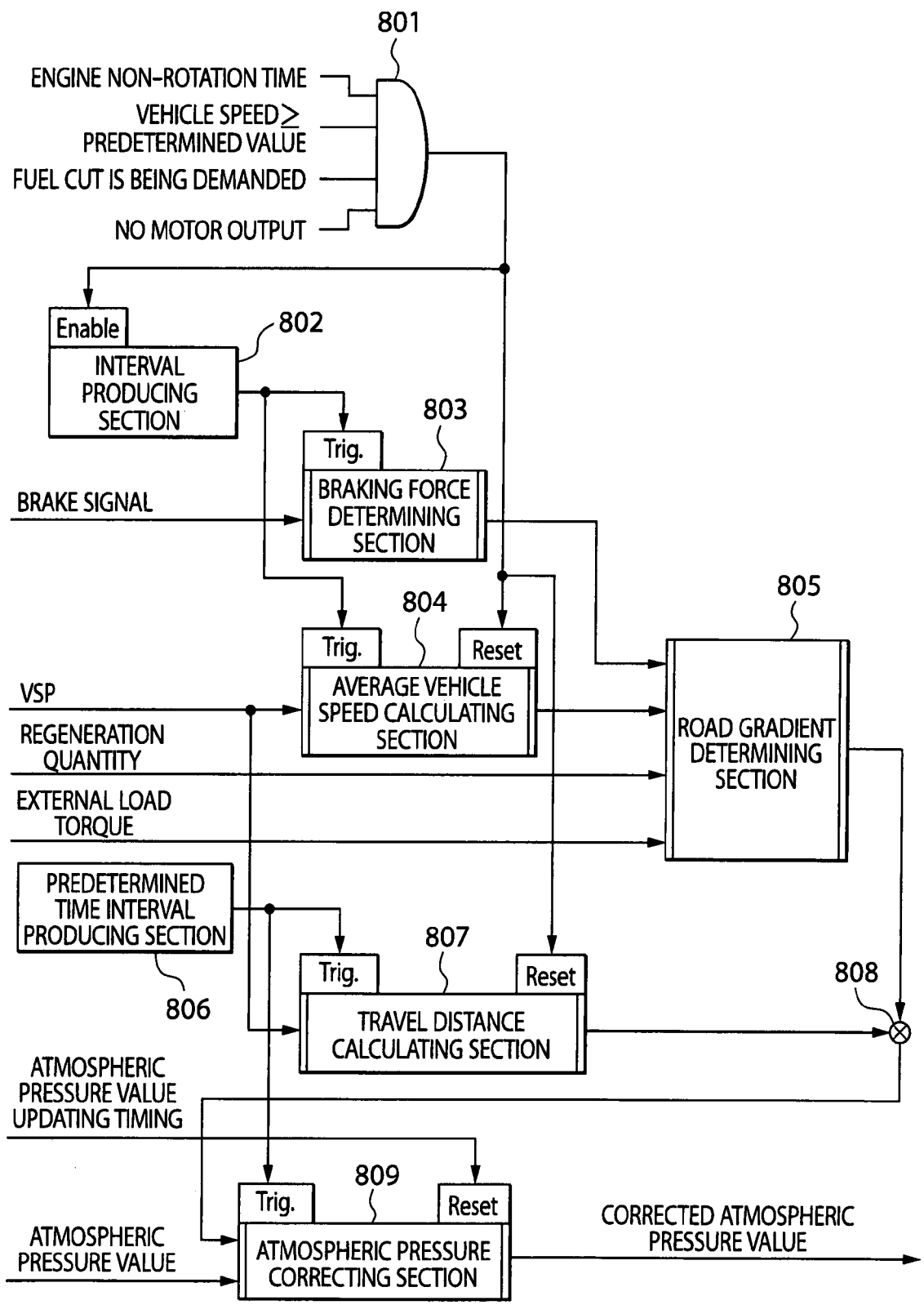
FIG. 8 is a diagram showing another detailed block configuration of the road gradient computing means and the atmospheric pressure correcting means of the engine controller of the embodiment.

FIG. 8 is a diagram showing an example of a detailed block configuration of the vehicle vertical travel calculating section 108 with the road gradient calculating section and the atmospheric pressure correcting section, in a hybrid automobile car having a motor generator. The points different from the foregoing embodiment shown in FIG. 7 are as follows. A condition that the motor is not driving is added to a logic device 801 for determining whether road gradient is calculated by the road gradient calculating section or not, and are generation quantity and an external load torque are input to the road gradient calculating section.

Figure 9A:
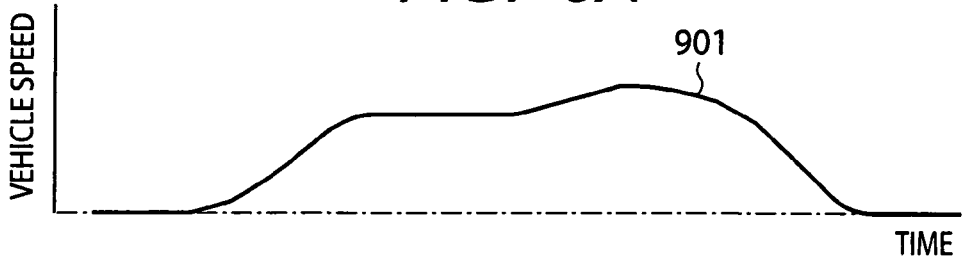
FIG. 9 are diagrams showing an interval generating method in interval generating means 702 and 802 in the engine controller of the embodiment.
Figure 9B:
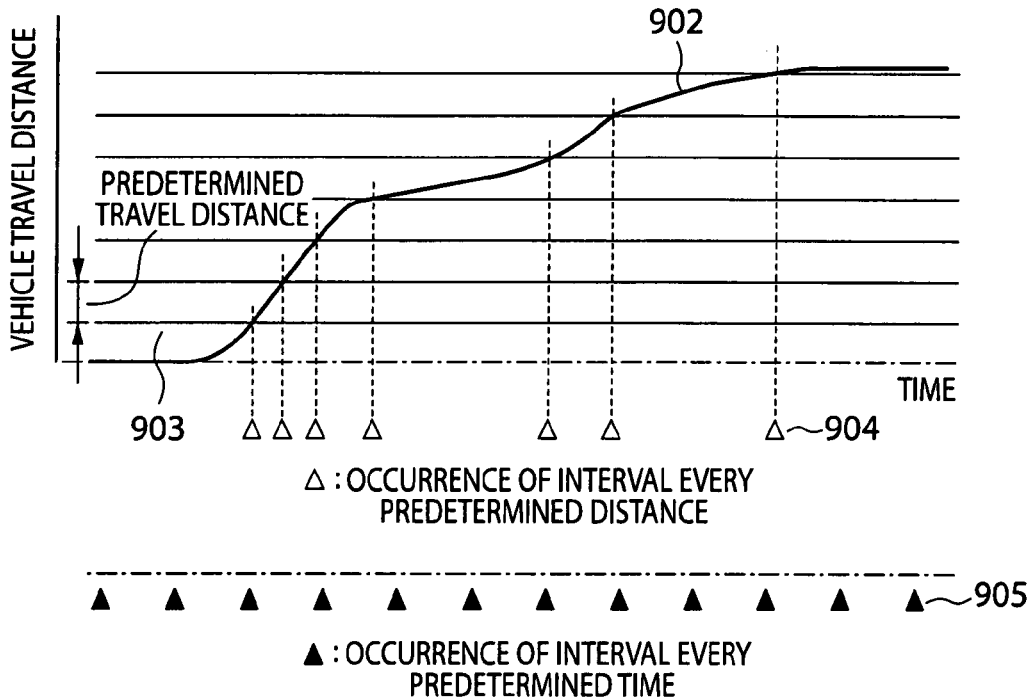

FIG. 9 are diagrams showing an interval producing method of generating a trigger every predetermined interval from each of interval producing sections 702 and 802 in FIGS. 7 and 8. In FIG. 9(a), a chart 901 shows the car speed. In FIG. 9(b), a chart 902 shows the travel distance of the car. The interval producing method of generating a trigger from each of the interval producing sections 702 and 802 includes the case of generating a trigger every predetermined travel distance 903 and the case of generating a trigger every predetermined time. In the case of generating a trigger every predetermined travel distance 903, the each of predetermined intervals are represented by each of predetermined intervals 904 expressed by Δ. In the case of generating a trigger every predetermined time, the each of predetermined intervals are represented by each of predetermined intervals 905 expressed by ▲.

Figure 10:
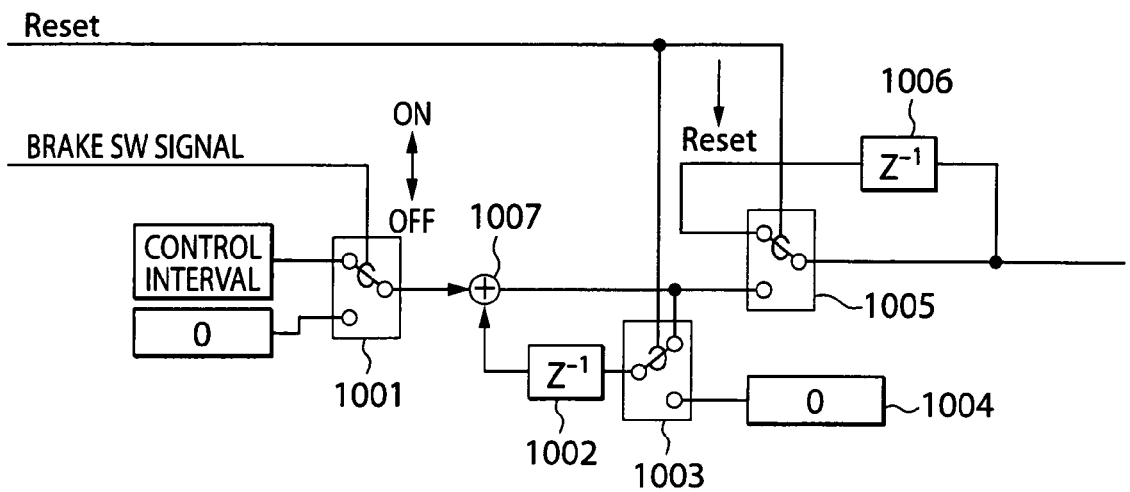
FIG. 10 is a detailed block configuration diagram showing an example of braking force determining means in the engine controller of the embodiment.

FIG. 10 is a diagram showing an example of a detailed block configuration of each of the braking force determining sections 703 and 803 in FIGS. 7 and 8. The whole block is driven in a predetermine control interval such as 10 ms. When a brake is operated and a brake ON signal is input from a brake SW, time of such control interval is integrated as brake ON time by an adder 1007, a switch 1001, and a delay unit 1002.

The trigger signal produced every predetermined interval from one of the interval producing sections 702 and 802 is input as a reset signal. The brake ON time integrated until then is output by a switch 1005 to a delay unit 1006 and is held in the delay unit 1006. The brake ON time held in the delay unit 1002 is cleared by a switch 1003 and a block 1004.

Figure 11:
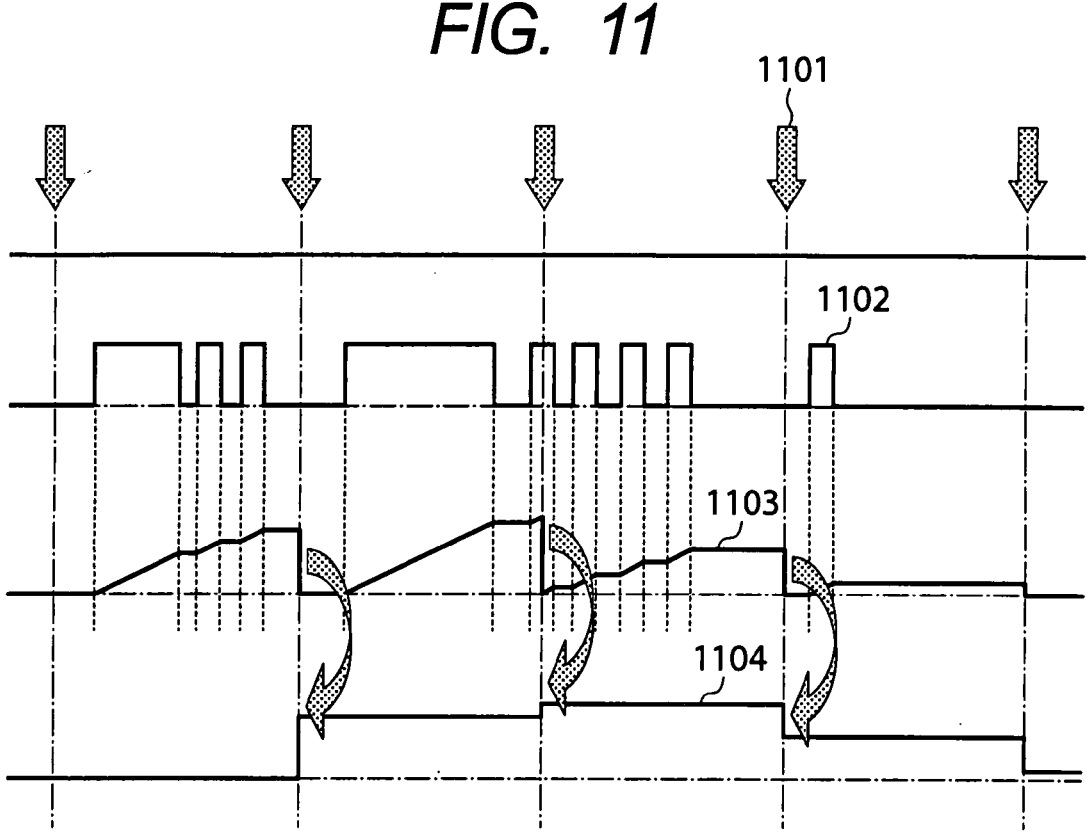
FIG. 11 is a chart showing an integration state of ON time of a brake switch in the braking force determining means in the engine controller of the embodiment.

FIG. 11 shows an example of a chart of integration of time of the control interval in the state where the brake SW is ON in the braking force determining sections 703 and 803 illustrated in FIG. 10. A brake signal from the brake SW is an ON/OFF signal as shown by a chart 1102. A chart 1103 shows brake ON time obtained by integrating the time of the control interval in the brake ON state by the adder 1007, the switch 1001, and the delay unit 1002. A chart 1104 shows brake ON time which has been integrated until input of the reset signal and is output to the delay unit 1006 by the switch 1005 and held in the delay unit 1006.

Figure 12:
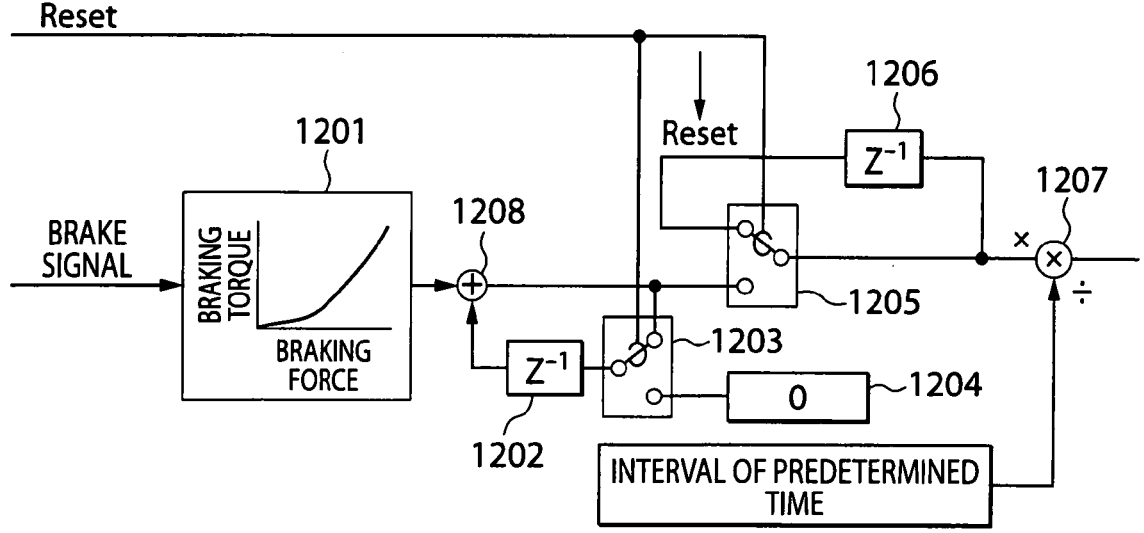
FIG. 12 is another detailed block configuration diagram of the braking force determining means of the engine controller of the embodiment.

FIG. 12 is a diagram showing another example of the detailed block configuration of one of the braking force determining sections 703 and 803 in FIGS. 7 and 8. FIG. 12 shows an example of the case where the magnitude of braking force is input from an electric brake or the like in contrast to the case where the braking force is input as an ON/OFF signal in FIG. 10. A table block 1201 is a map showing the relation between the braking force and the braking torque. In the table block 1201, the braking torque is retrieved from the map in relation to the input braking force. The retrieved braking torque is integrated by an adder 1208, a switch 1203, and a delay unit 1202.

The trigger signal generated every predetermined interval from one of the interval producing sections 702 and 802 is input as a reset signal to switches 1203 and 1205. An integration value of the braking torque integrated until then is held in the switch 1205 and a delay unit 1206. When the reset signal is input, an integration value of the braking torque held in the switch 1203 and the delay unit 1202 is cleared by the switch 1203 and a block 1204. The integration value of the braking torque held in the switch 1205 and the delay unit 1206 is divided by the time of the predetermined interval with a multiplier 1207, thereby calculating average braking torque in the predetermined interval.

Figure 13:
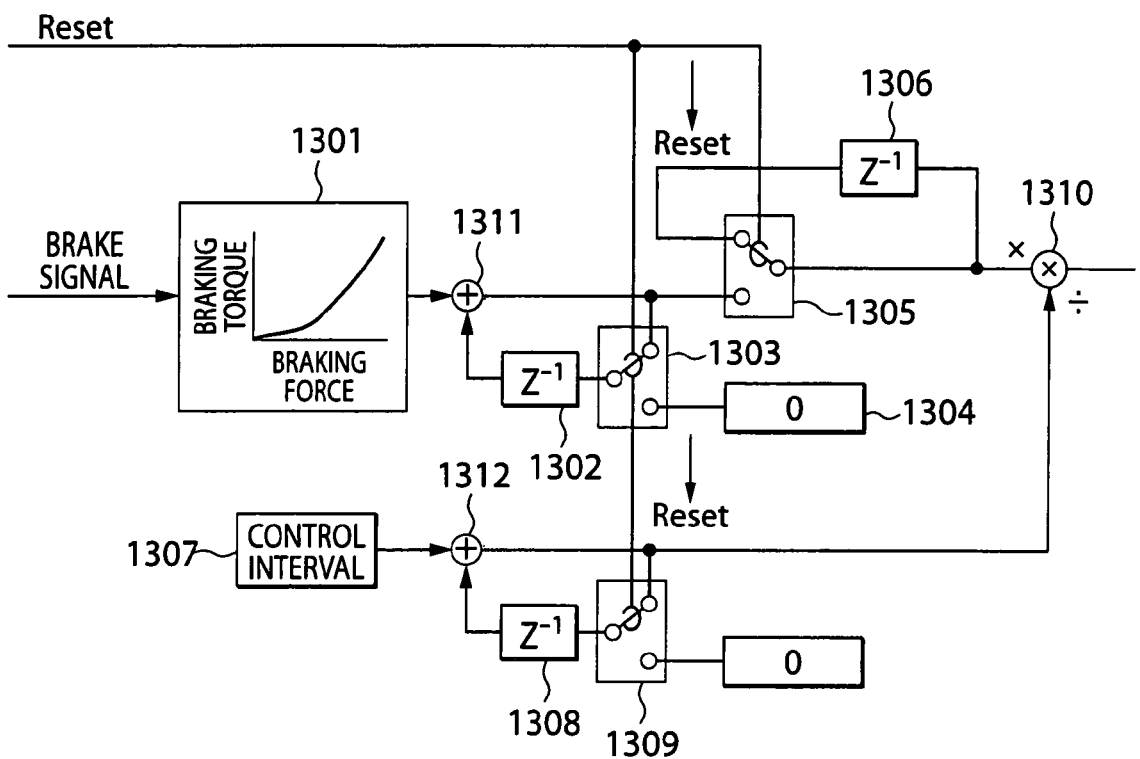
FIG. 13 is further another detailed block configuration diagram of the braking force determining means of the engine controller of the embodiment.

FIG. 13 is a diagram showing further another example of a detailed block configuration of one of the braking force determining sections 703 and 803 of FIGS. 7 and 8. FIG. 13 shows an example of the case where a trigger of one of the interval producing sections 702 and 802 is not generated every predetermined time (the predetermined interval is not predetermined time interval). Since the predetermined interval produced by one of the interval producing section 702 and 802 is not a predetermined time, the control interval 1307 in which a signal is generated, for example, every 10 ms is integrated by an adder 1312, a delay unit 1308, and a switch 1309, and time of the predetermined interval of one of the interval producing section 702 and 802 is obtained by the integration value of the control interval 1307. A multiplier 1310 obtains an average braking torque in the predetermined interval by dividing the braking torque in the predetermined interval integrated by the adder 1311, delay unit 1302, and switch 1303 by time of the obtained predetermined interval.

Figure 14:
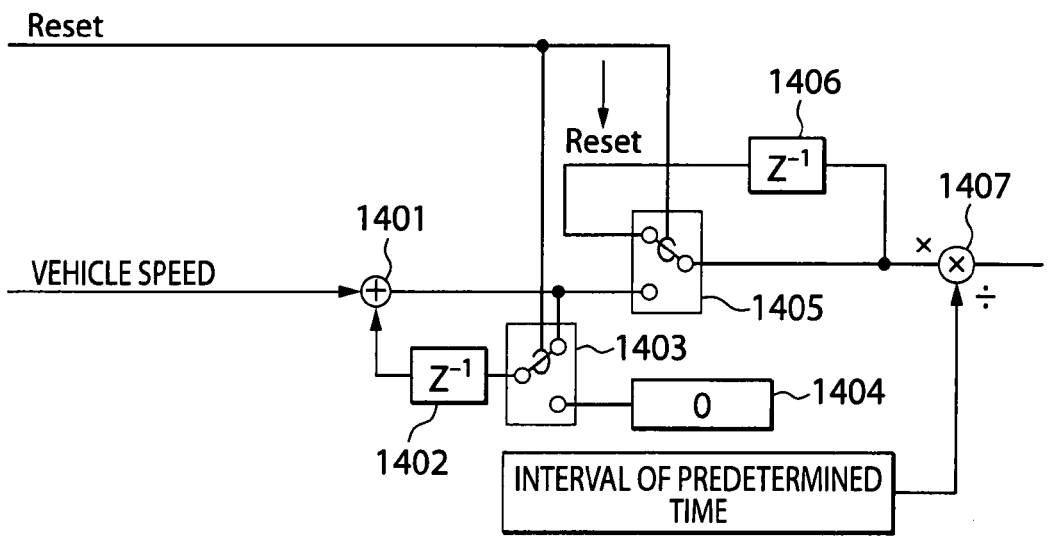
FIG. 14 is a detailed block configuration of average vehicle speed computing means of the engine controller of the embodiment.

FIG. 14 is a diagram showing an example of a detailed block configuration of one of the average vehicle speed calculating sections 704 and 804 in FIGS. 7 and 8, and shows an example of the case where a trigger of one of the interval producing means 702 and 802 is generated every predetermined time. The car speed value from the speed sensor 313 is integrated by an adder 1401, a delay unit 1402, and a switch 1403.

The trigger signal generated every predetermined time by one of the interval producing sections 702 and 802 is input as a reset signal to switches 1403 and 1405. An integration value of the car speed integrated until then is held in the switch 1405 and a delay unit 1406. When the reset signal is input, an integration value of the vehicle speed held in the switch 1403 and the delay unit 1402 is cleared by the switch 1403 and a block 1404. A multiplier 1407 divides the integration value of the vehicle speed held in the switch 1405 and the delay unit 1406 by the time of the predetermined interval, thereby calculating average vehicle speed in the predetermined interval.

Figure 15:
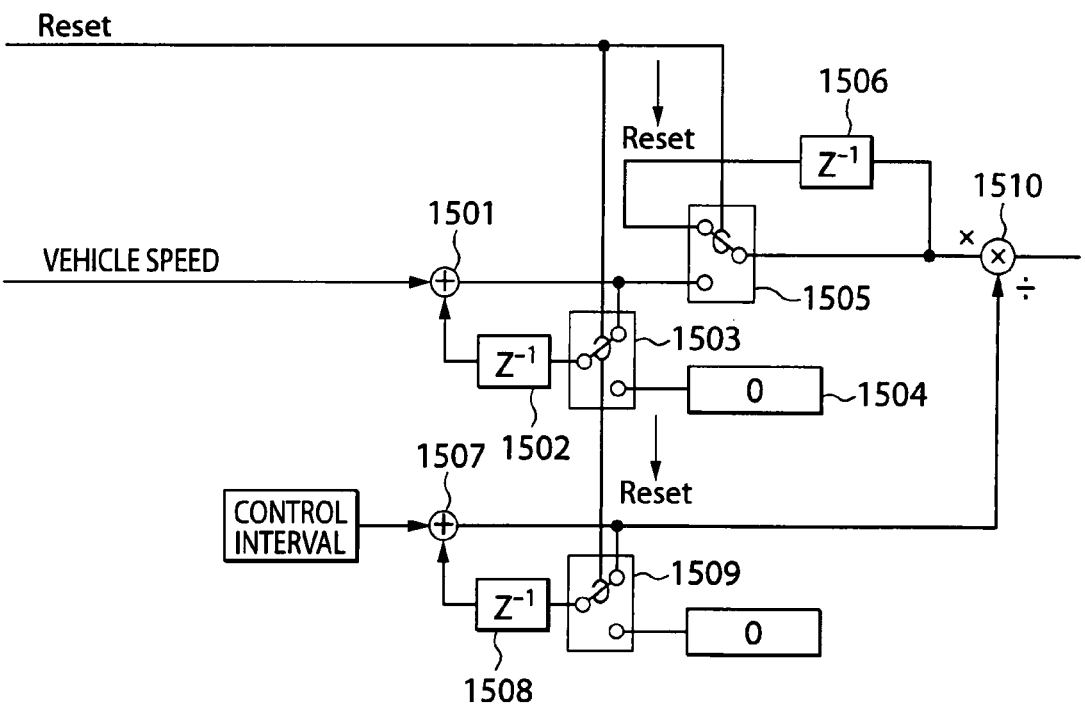
FIG. 15 is another detailed block configuration diagram of the average vehicle speed computing means of the engine controller of the embodiment.

FIG. 15 is a diagram showing another example of a detailed block configuration of one of the average vehicle speed calculating sections 704 and 804 of FIGS. 7 and 8. FIG. 15 shows an example of the case where a trigger of one of the interval producing sections 702 and 802 is not generated every predetermined time (the predetermined interval is not predetermined time interval). In a manner similar to FIG. 14, the car speed from the vehicle speed sensor 313 is integrated every predetermined interval. For example, the control interval in which a signal is generated every 10 ms is integrated by an adder 1507, a delay unit 1508, and a switch 1509, thereby obtaining time in a predetermined interval. A multiplier 1510 obtains average vehicle speed in the predetermined interval by dividing the integrated value of the vehicle speed held by a switch 1505 and a delay unit 1506 by the obtained time of the predetermined interval.

Figure 16:
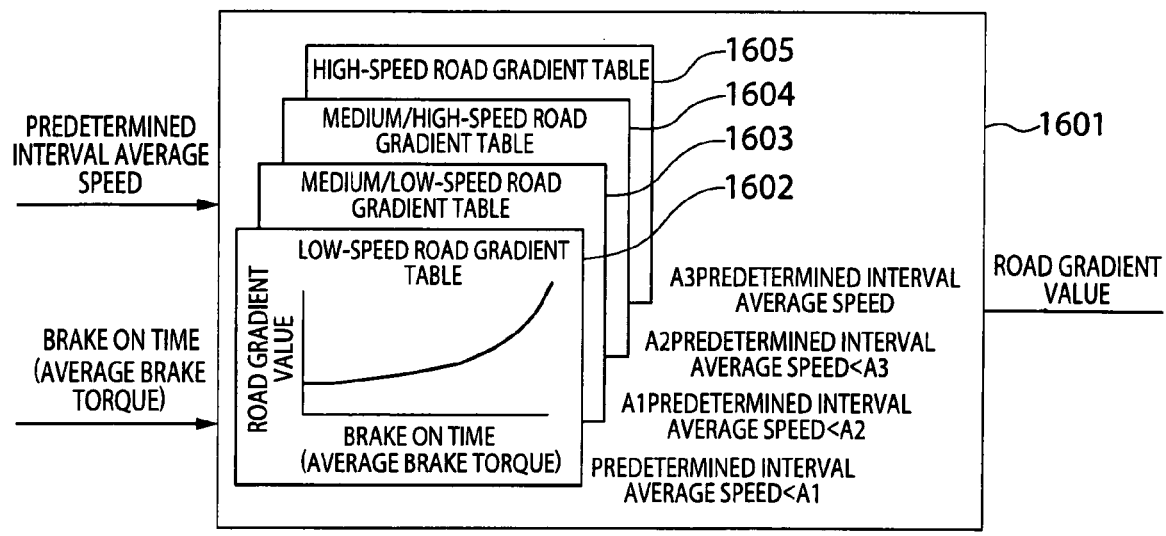
FIG. 16 is a detailed block configuration diagram showing an example of the road gradient determining means of the engine controller of the embodiment.

FIG. 16 is a diagram showing an example of a detailed block configuration of one of the road gradient determining sections 705 and 805 in FIGS. 7 and 8. A table block 1601 shows the relation between the brake ON time every average vehicle speed (or average brake torque) and a road gradient value. A low-speed road gradient table 1602 shows the relation between the brake ON time (or average brake torque) and the road gradient value when an average speed in a predetermined interval is lower than a threshold A1. An medium/low-speed road gradient table 1603 shows the relation between the brake ON time (or average braking torque) and the road gradient value when the average speed in the predetermined interval is equal to or higher than the threshold A1 and less than a threshold 2. An medium/high-speed road gradient table 1604 shows the relation between the brake ON time (or average braking torque) and the road gradient value when the average speed is equal to or higher than the threshold A2 and less than a threshold A3. A high-speed road gradient table 1605 shows the relation between the brake ON time (or average braking torque) and the road gradient value when the average speed is equal to or higher than the threshold A3. The target road gradient table is selected according to the input average speed of the predetermined interval. A road gradient value is retrieved by searching the map in relation to the input brake ON time (or average braking torque) in the selected road gradient table, and the obtained road gradient value is output.

Figure 17:
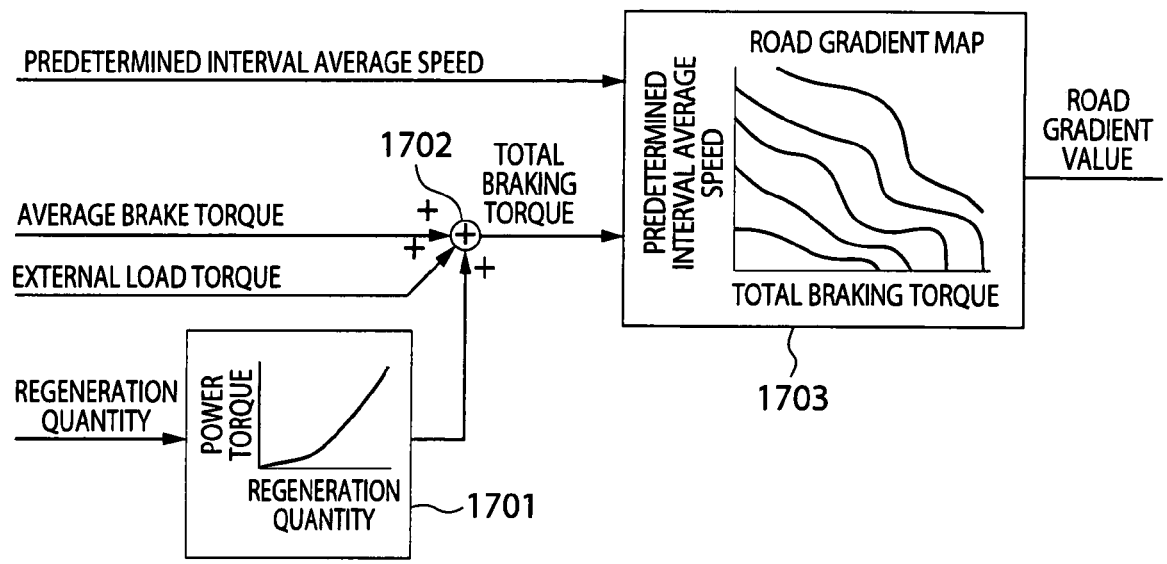
FIG. 17 is another detailed block configuration diagram of the road gradient determining means of the engine controller of the embodiment.

FIG. 17 is a diagram showing another example of a detailed block configuration of one of the road gradient determining sections 705 and 805 in FIGS. 7 and 8 and mainly illustrates the case of a hybrid vehicle. A table block 1701 shows the relation between a regeneration quantity and a power torque as regeneration torque. In the table block 1701, the power torque is retrieved by searching a map of the table block 1701 in relation to the regeneration quantity, and the retrieved power torque is output to an adder 1702. The adder 1702 adds the average brake torque, external load torque, and power torque (regeneration torque), thereby calculating total braking torque. A table block 1703 shows the relation among the total braking torque, the average speed in the predetermined interval, and the road gradient. In the table block 1703, the road gradient value is retrieved by searching the map in relation to the average speed in the predetermined interval and the total braking torque, and the obtained road gradient value is output.

Figure 18:
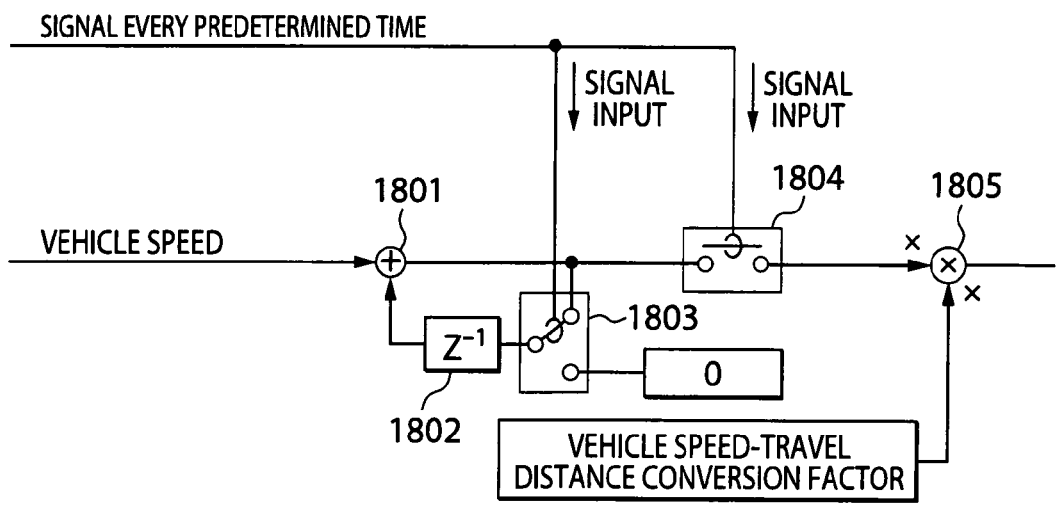
FIG. 18 is a detailed block configuration diagram of travel distance computing means of the engine controller of the embodiment.

FIG. 18 is a diagram showing an example of a detailed block configuration of one of the vehicle travel distance calculating sections 707 and 807 in FIGS. 7 and 8. The car speed input from the car speed sensor 313 is integrated for predetermined time by an adder 1801, a delay unit 1802, and a switch 1803. When a signal is input every predetermined time, a switch 1804 is turned on, an integration value of the car speed integrated by the adder 1801 for the predetermined time is output to a multiplier 1805 and is multiplied with a car speed-travel distance conversion factor in the multiplier 1805, thereby calculating a car travel distance in the predetermined time.

Figure 19:
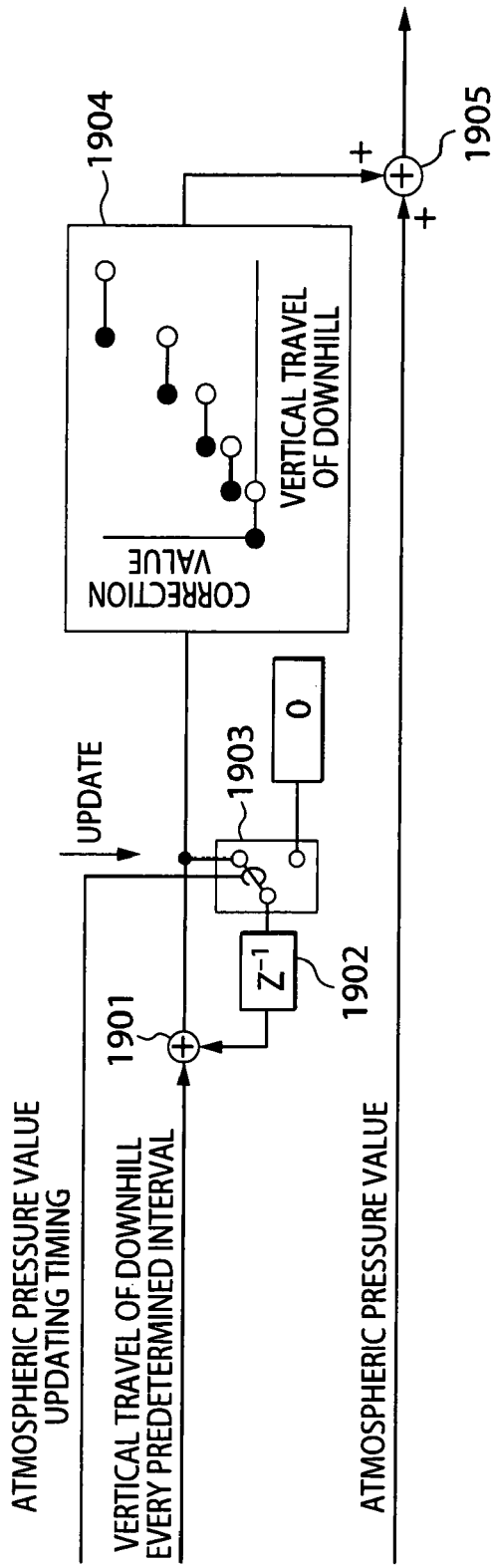
FIG. 19 is a detailed block configuration diagram showing an example of atmospheric pressure correcting means of the engine controller of the embodiment.

FIG. 19 is a diagram showing a detailed block configuration of one of the atmospheric pressure correcting means 709 and 809 in FIGS. 7 and 8. Predetermined interval-by-predetermined interval vehicle vertical travel of a downhill, which is calculated from predetermined interval-by-predetermined interval vehicle travel distance calculated by one of the car travel distance calculating sections 707 and 807 and the road gradient value obtained by one of the road gradient determining sections 705 and 805, is integrated by an adder 1901, a delay unit 1902, and a switch 1903, thereby obtaining a total vehicle vertical travel of the downhill when the car descended the downhill.

In a table block 1904, atmospheric pressure correction values with respect to the vehicle vertical travel of a downhill are shown nonlinearly without any interpolation. In the table block 1904, the atmospheric pressure correction value is retrieved by searching the map in relation to the vehicle vertical travel of a downhill. The atmospheric pressure correction value is added to the atmospheric pressure value, which is obtained by the atmospheric pressure obtaining section in FIG. 5, by an adder 1905, thereby correcting the atmospheric pressure value. In such a manner, the atmospheric pressure value at the point where the car has descended can be grasped.

Figure 20:
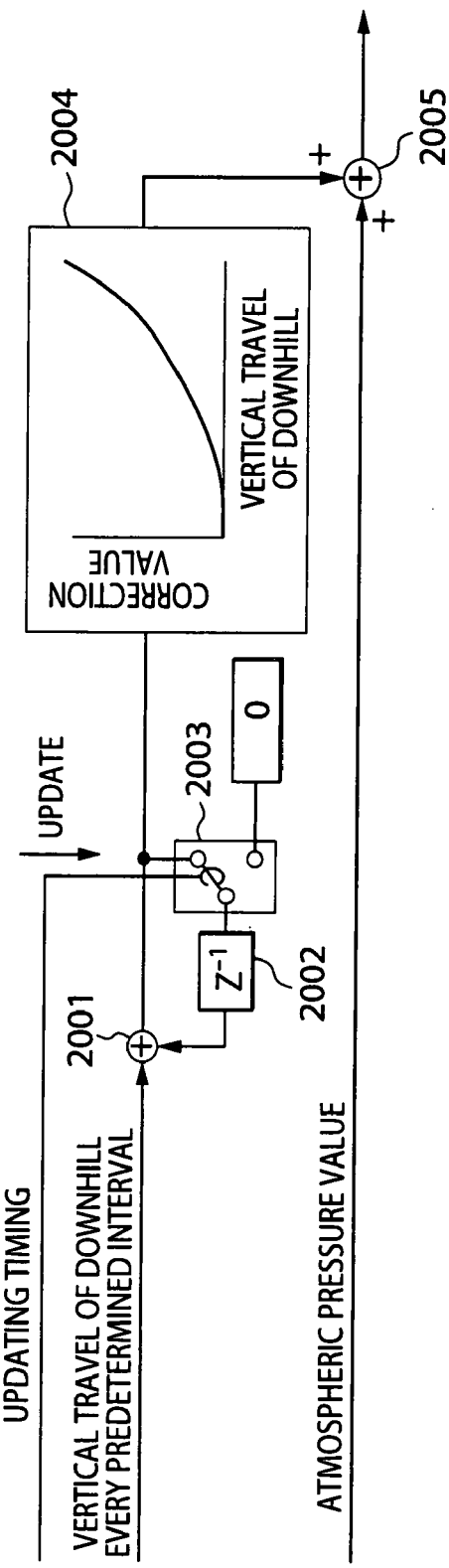
FIG. 20 is another detailed block configuration diagram of the atmospheric pressure correcting means of the engine controller of the embodiment.

FIG. 20 is a diagram showing another example of a detailed block configuration of one of the atmospheric pressure correcting sections 709 and 809 in FIGS. 7 and 8. In the table block 1904 shown in FIG. 19, atmospheric pressure correction values are not continuous and are not compensated. In contrast, in a table block 2004 in FIG. 20, the atmospheric pressure correction value with respect to the vehicle vertical travel of a downhill is expressed by an interpolated continuous line.

Figure 21:
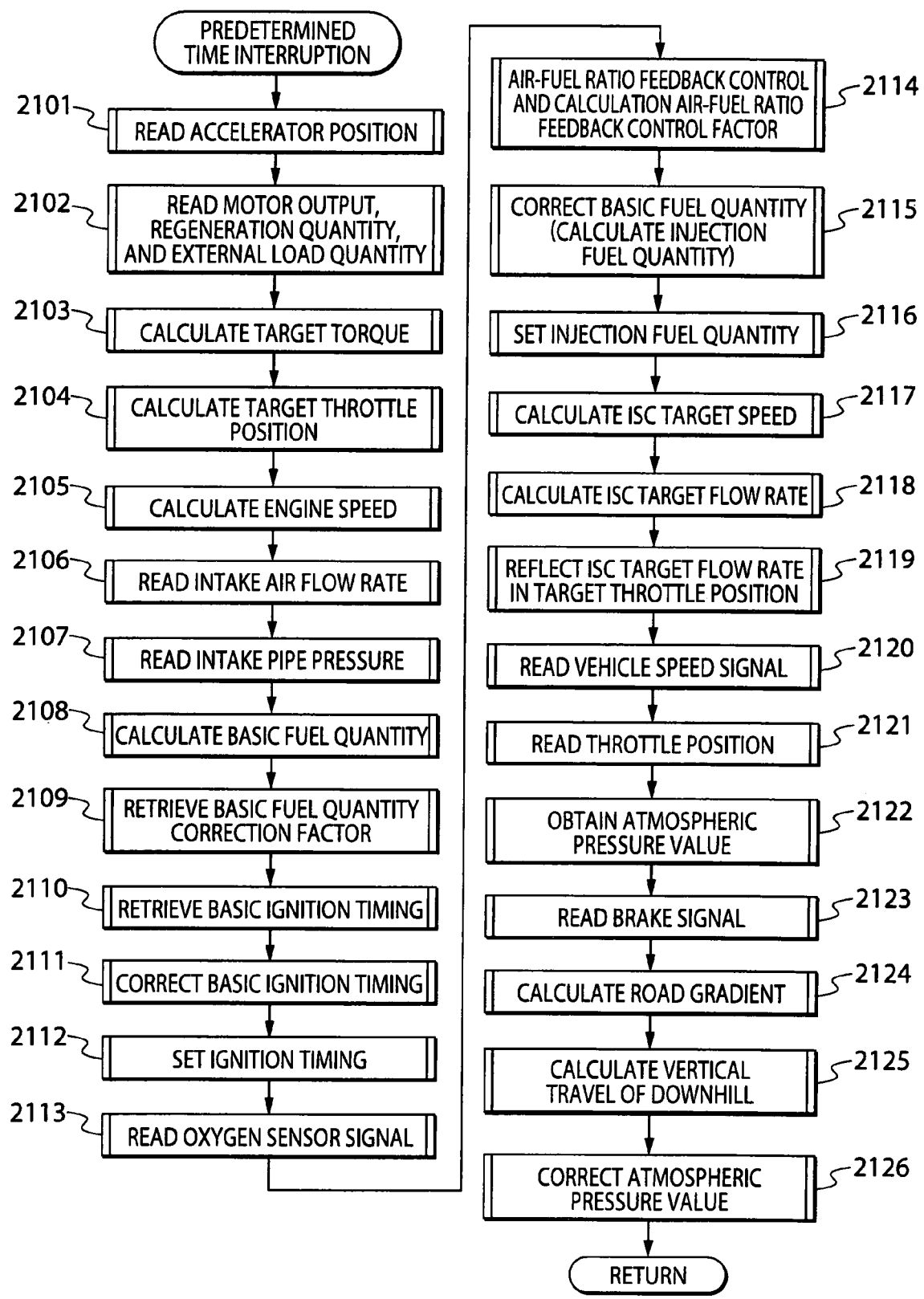
FIG. 21 is a flowchart showing control operation of the engine controller of the embodiment.

The operation of the engine control system constructed as described above will be described below. FIG. 21 is a flowchart showing braking operation of the engine control unit 316 having the road gradient calculating section in FIG. 2. First, an accelerator position is read from the accelerator position sensor in step 2101. In the case of a hybrid vehicle, in step 2102, a motor output, a power regeneration quantity, and an external load are read. In step 2103, a target torque is calculated on the basis of the accelerator position, motor output, power regeneration quantity, and external load. In step 2104, a target throttle position is calculated on the basis of the target torque calculated in step 2103. In step 2105, engine speed is calculated from a signal of the crank angle sensor. In step 2106, the intake air flow rate is read from the mass air flow sensor. In step 2107, intake pipe pressure from the intake pipe pressure sensor is read. In step 2108, the basic fuel quantity is calculated on the basis of the intake air flow rate and the engine speed. In step 2109, the basic fuel-correction factor is retrieved by searching the map in relation to the engine speed and the intake pipe pressure. In step 2110, the basic ignition timing is retrieved. In step 2111, the basic ignition timing is corrected. In step 2112, the ignition timing is set. In step 2113, a signal from the oxygen sensor is read. In step 2114, air-fuel ratio feedback control is performed using a signal from the oxygen sensor, the engine speed, and the like, thereby calculating the air-fuel ratio feedback control factor. In step 2115, the basic fuel quantity is corrected with the basic fuel-correction factor and the air-fuel feedback control factor. In step 2116, the quantity of fuel to be injected by the fuel injector is set. In step 2117, a target idle speed of ISC is calculated on the basis of the engine water temperature and the like. In step 2118, target flow rate of the ISC is calculated from the target idle speed. In step 2119, the target flow rate of the ISC is reflected in the target throttle position. In step 2120, a vehicle speed signal is read. In step 2121, throttle position is read. In step 2122, an atmospheric pressure value is obtained from the intake pipe pressure. In step 2123, a brake signal is read. In step 2124, the road gradient value is calculated on the basis of the brake signal and the car speed signal. In the case of a hybrid vehicle, the motor output, the regeneration quantity, and the external load torque are also used for calculating the road gradient value. In step 2125, the vehicle vertical travel of a downhill is calculated on the basis of the road gradient value and the vehicle travel distance. In step 2126, the atmospheric pressure correction value is obtained on the basis of the vehicle vertical travel and the atmospheric value is corrected with the correction value.

Figure 22:
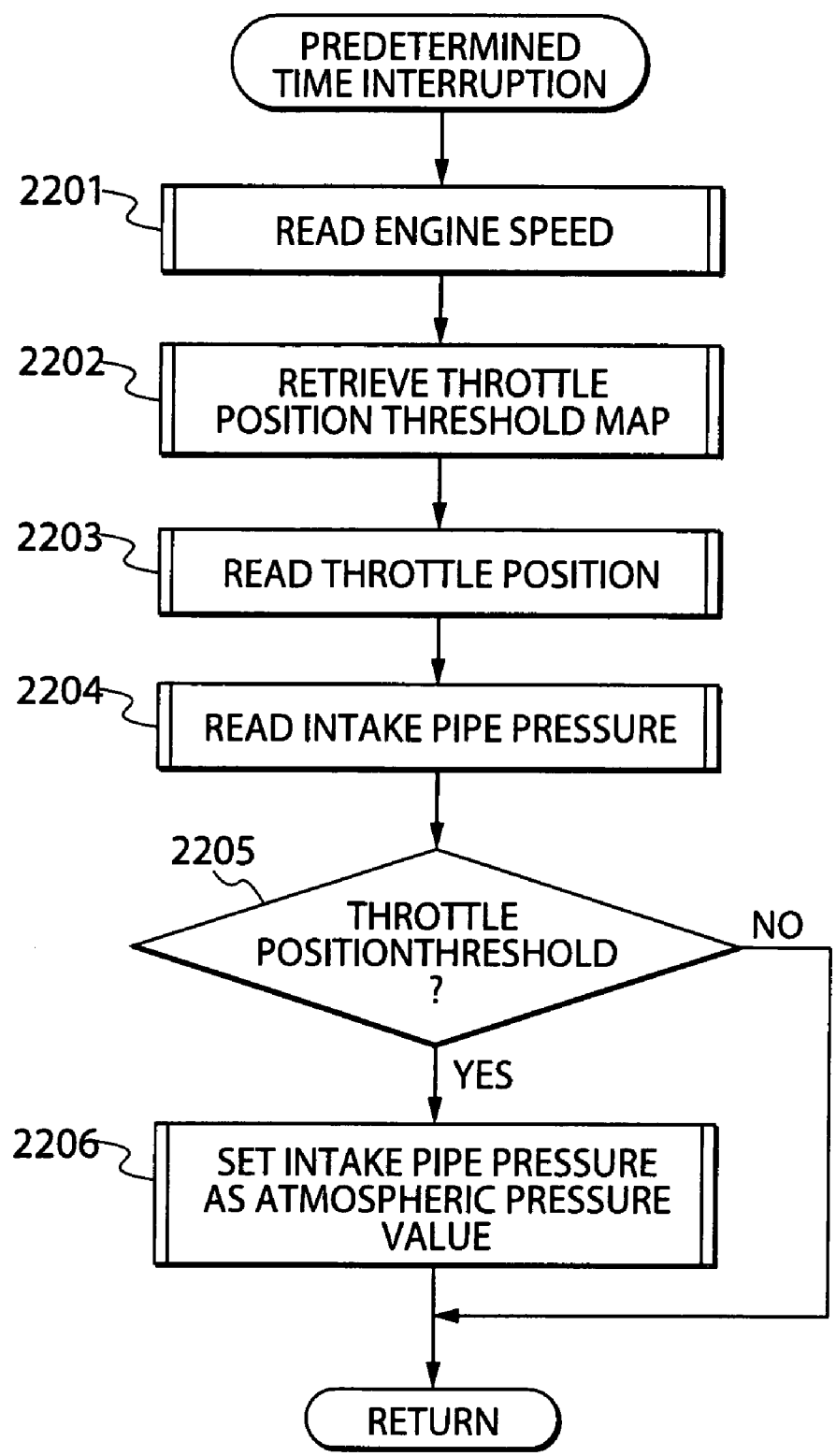
FIG. 22 is a flowchart showing operations of the atmospheric pressure obtaining means in the engine controller of the embodiment.

FIG. 22 is a flowchart showing the operations of the atmospheric pressure obtaining section in FIG. 5. In step 2201, engine speed is read. In step 2202, a throttle position threshold is retrieved from the map in relation to the engine speed. In step 2203, the throttle position is read from the throttle position sensor. In step 2204, intake pipe pressure is read from the intake pipe pressure sensor. In step 2205, the throttle position is compared with the threshold. When the throttle position is larger than the threshold of the throttle position, the present intake pipe pressure is obtained as an atmospheric pressure value in step 2206.

Figure 23:
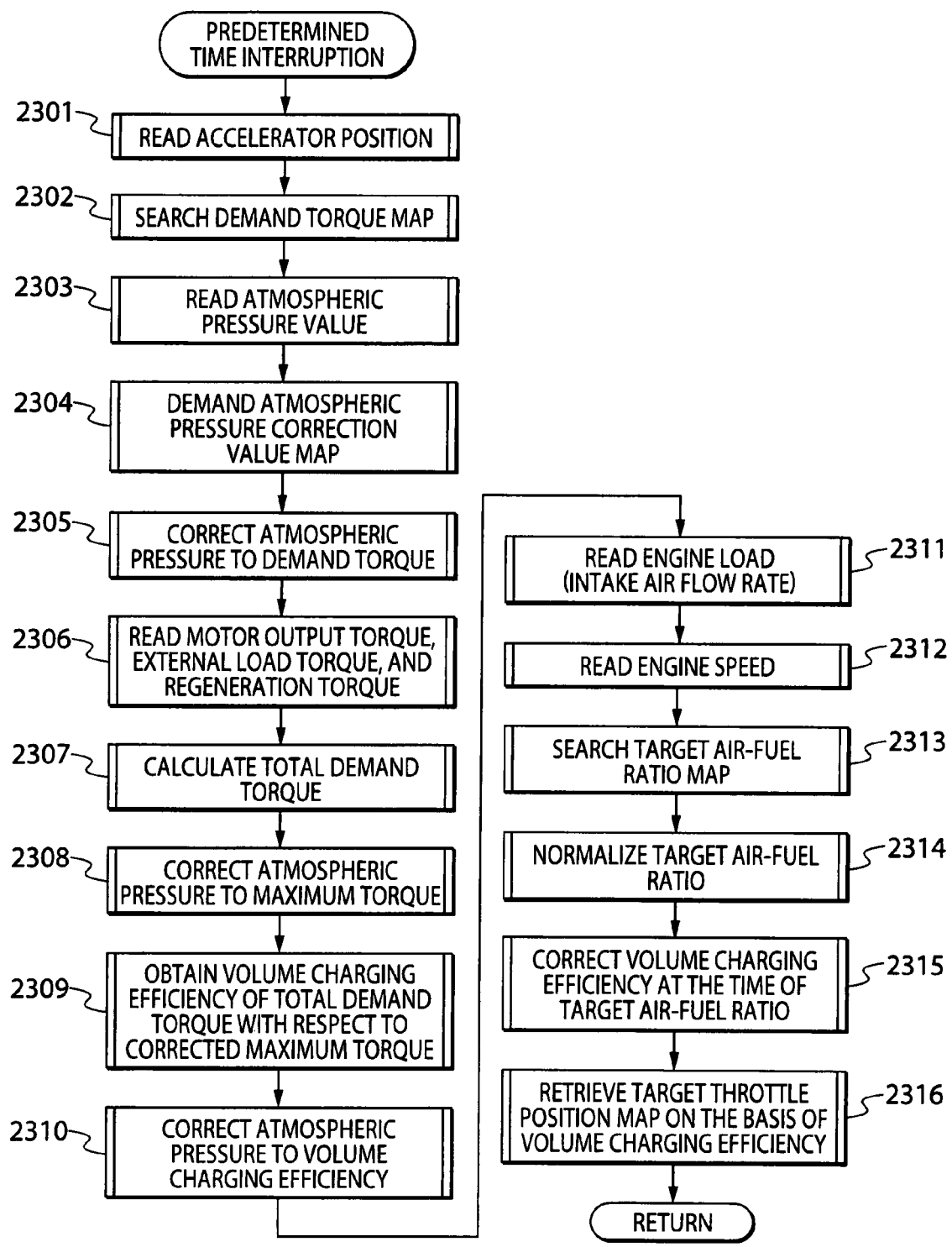
FIG. 23 is a flowchart showing control operations of demand torque computing means in the engine controller of the embodiment.

FIG. 23 is a flowchart showing the control operation of the demand torque computing section in FIG. 6. It especially shows a computation for obtaining a target torque and a computation for obtaining a target position of the electronic control throttle on the basis of the target torque. In step 2301, accelerator position is read. In step 2302, demand torque is retrieved from the map on the basis of the accelerator position. In step 2303, an atmospheric pressure value is read. In step 2304, an atmospheric pressure correction value is retrieved from the map on the basis of the atmospheric pressure value. In step 2305, the demand torque is corrected with the atmospheric pressure correction value retrieved from the map. Step 2306 is a step performed in the case of a hybrid vehicle. In step 2306, a motor output torque, a regeneration torque, and an external load torque are read. In step 2307, the motor output torque, the regeneration torque, and the external load torque are added to the demand torque, thereby obtaining total demand torque. In step 2308, atmospheric pressure correction is made on the maximum torque. In step 2309, a volume charging efficiency is obtained at the ratio of the total demand torque with respect to the maximum torque subjected to the atmospheric pressure correction. In step 2310, the atmospheric pressure correction is further made on the volume charging efficiency. In step 2311, an engine load (intake air volume) is read. In step 2312, engine speed is read. In step 2313, the target air-fuel ratio is retrieved from the map on the basis of the engine speed and the engine load. In step 2314, the proportion of the target air-fuel ratio to the stoichiometric air-fuel ratio is obtained. In step 2315, the volume charging efficiency at the time of the stoichiometric air-fuel ratio is corrected. In step 2316, the target throttle position is retrieved from the map in relation to the final volume charging efficiency.

Figure 24:
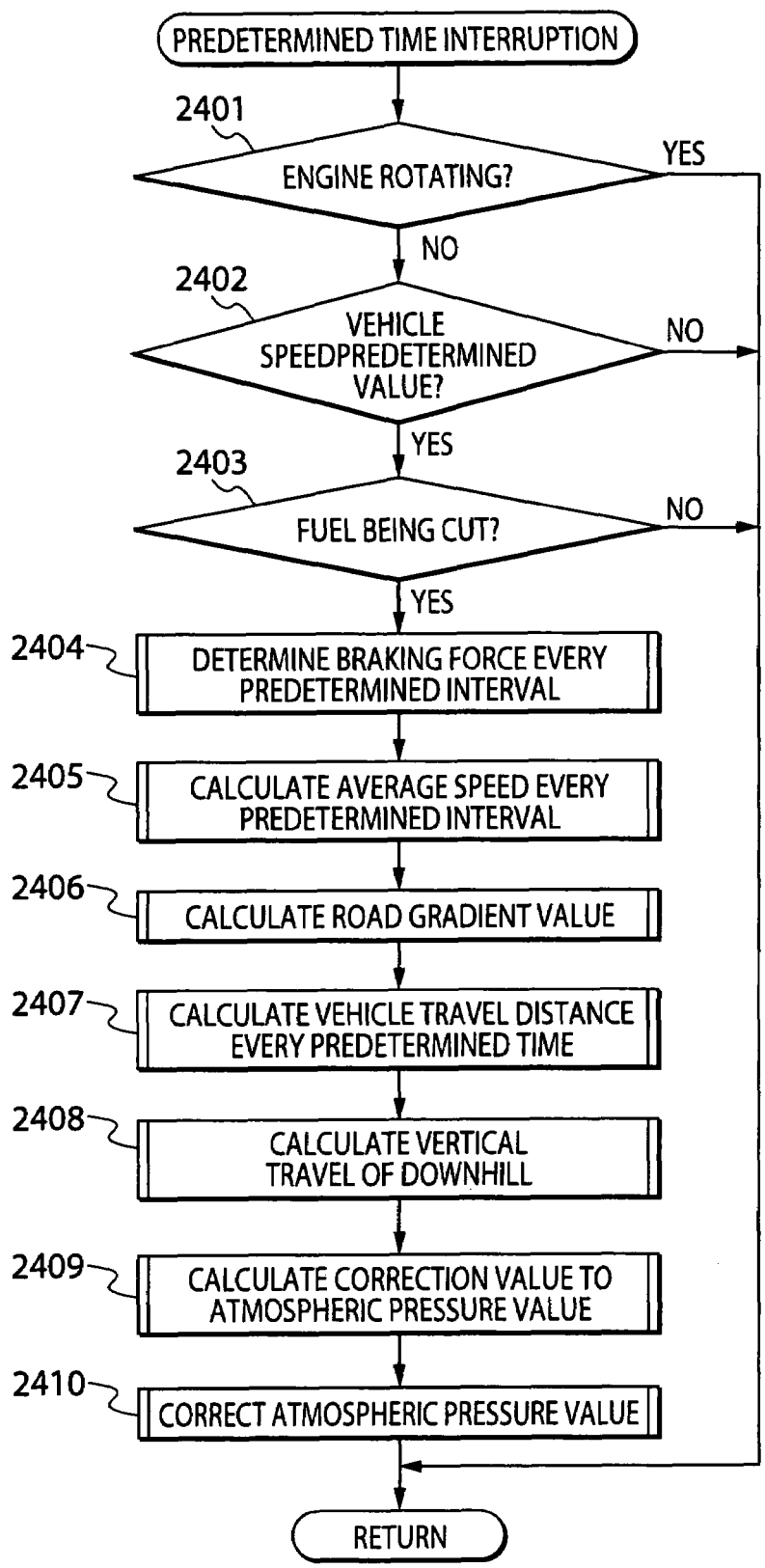
FIG. 24 is a flowchart showing operations of the road gradient computing means and atmospheric pressure correcting means in the engine controller of the embodiment.

FIG. 24 is a flowchart showing operations of the vehicle vertical travel calculating section including the road gradient calculating section and the atmospheric pressure correcting section in FIG. 7. In step 2401, whether the engine is rotating or not is determined. In 2402, whether the car speed is equal to or higher than a predetermined value or not is determined. In step 2403, whether the fuel is being cut or not is determined. When the engine is not rotating, the car speed is equal to or higher than the predetermined value, and the fuel is being cut, the braking force every predetermined interval is determined in step 2404. In step 2405, an average vehicle speed in each predetermined interval is calculated. In step 2406, the road gradient value is retrieved from the map in relation to the braking force and the average car speed. In step 2407, the car travel distance in each predetermined interval is calcurated. In step 2408, the vehicle vertical travel of a downhill is calcurated on the basis of the road gradient value and the car travel distance. In step 2409, the atmospheric pressure correction value to the atmospheric pressure value is obtained on the basis of the vehicle vertical travel of a downhill. In step 2410, an atmospheric pressure value is corrected with the atmospheric pressure correction value.

Figure 25:
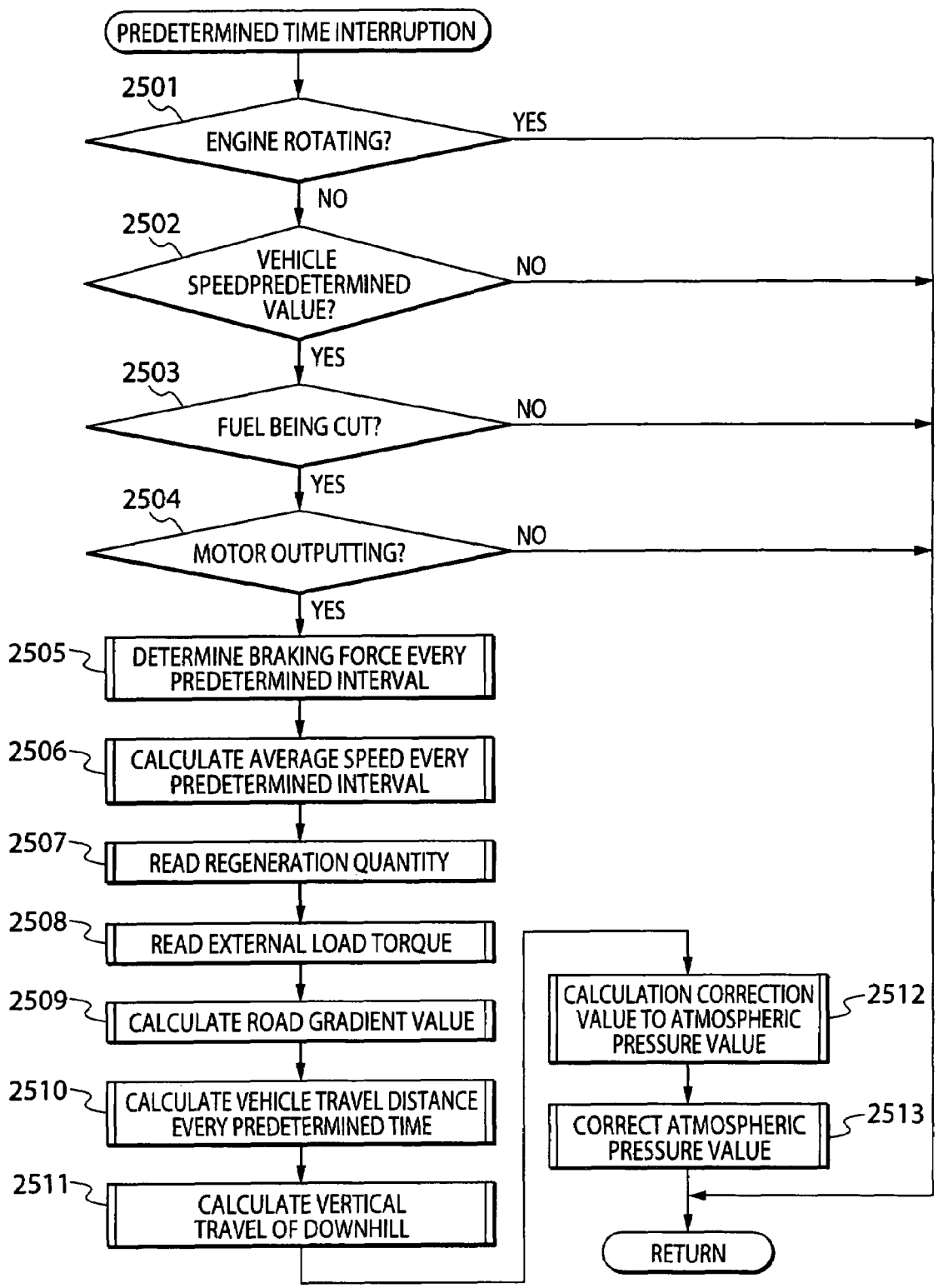
FIG. 25 is another flowchart showing operations of the road gradient computing means and the atmospheric pressure correcting means in the engine controller of the embodiment.

FIG. 25 is a flowchart showing operations of the vehicle vertical travel calculating section including the road gradient calculating means and the atmospheric pressure correcting means in FIG. 8, and mainly shows an example of the case of a hybrid vehicle. The points different from the flowchart of FIG. 24 are as follows. A precondition that the motor is not outputting in step 2504 is included. Step 2507 of reading a power regeneration amount and step 2508 of reading the external load torque are added.

Figure 26:
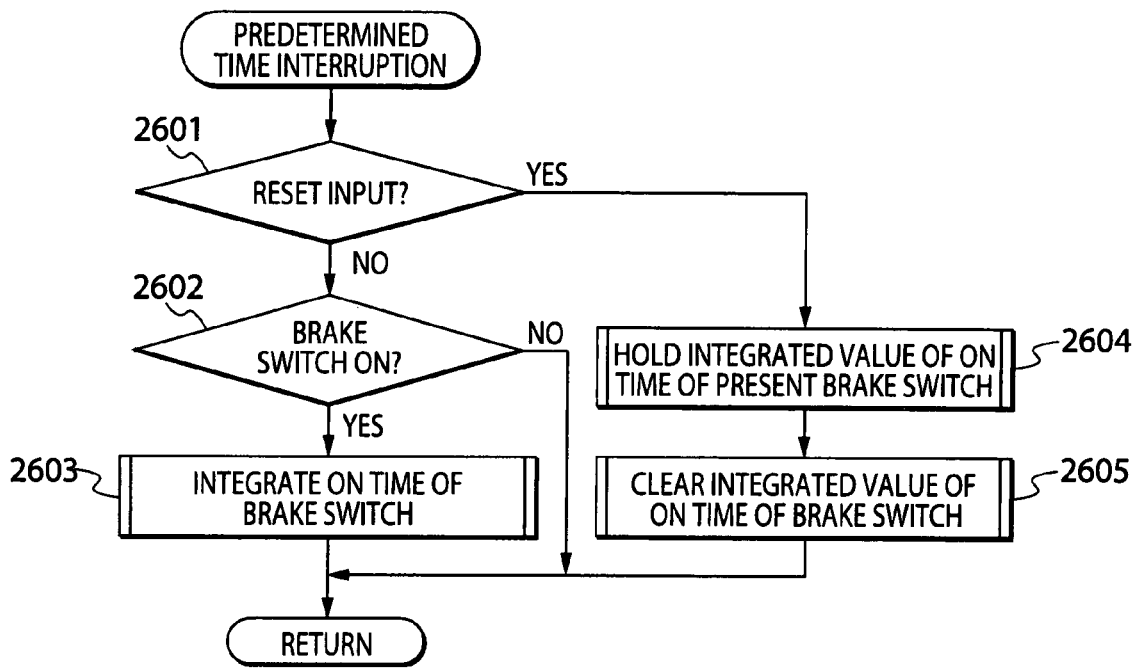
FIG. 26 is a flowchart showing operations of the braking force determining means in the engine controller of the embodiment.

FIG. 26 is a flowchart showing operations of the braking force determining section in FIG. 10. In step 2601, whether a reset signal is input or not is determined. When the reset signal is not input, whether an ON signal is input from the brake switch or not is determined in step 2602. When the ON signal is input from the brake switch, the ON time of the brake switch is integrated in step 2603. When the reset signal is input in step 2601, an integration value of the brake ON time of the present brake switch is held and output in step 2604. In step 2605, the integrated value of the ON time of the brake switch is cleared.

Figure 27:
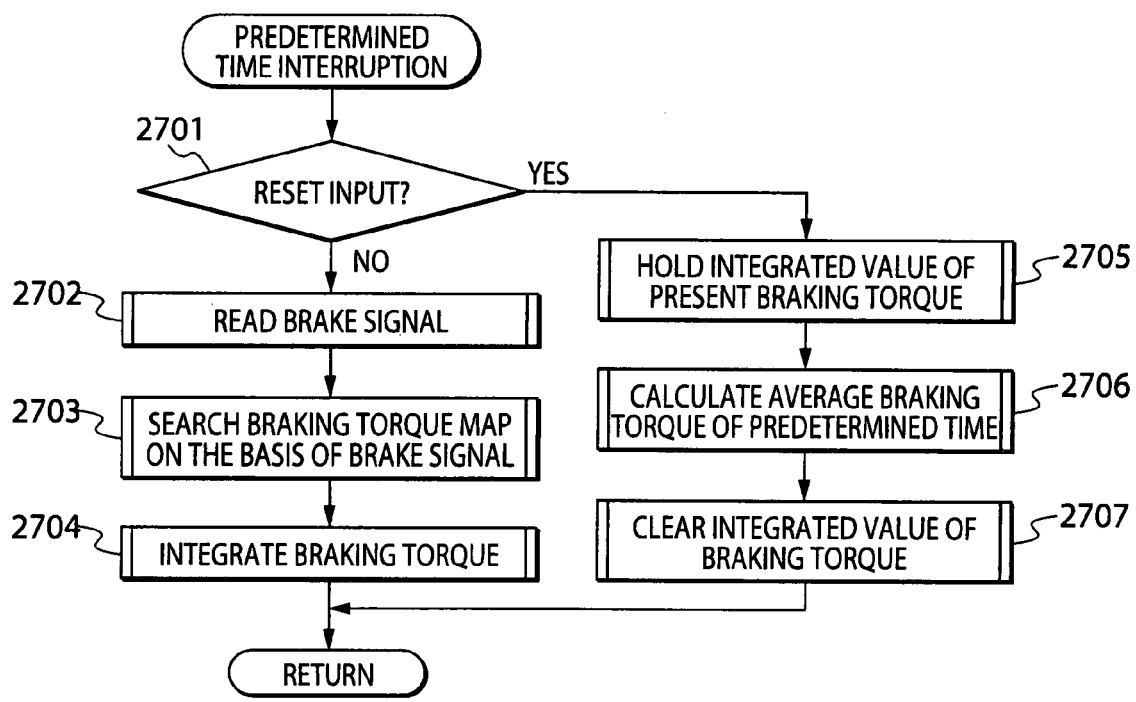
FIG. 27 is a flowchart showing operations of another braking force determining means in the engine controller of the embodiment.

FIG. 27 is a flowchart showing operations of the braking force determining section illustrated in FIG. 12, in which the braking force is input as its magnitude, not the ON/OFF signal. In step 2701, whether the reset signal is input or not is determined. When the reset signal is not input, a brake signal is read in step 2702. In step 2703, braking torque is retrieved from the map on the basis of the brake signal. In step 2704, the braking torque retrieved from the map is integrated. When the reset signal is input in step 2701, the present braking torque integration value is held in step 2705. In step 2706, the average braking torque in a predetermined interval as a predetermined time interval is computed. After that, in step 2707, the braking torque integration value is cleared.

Figure 28:
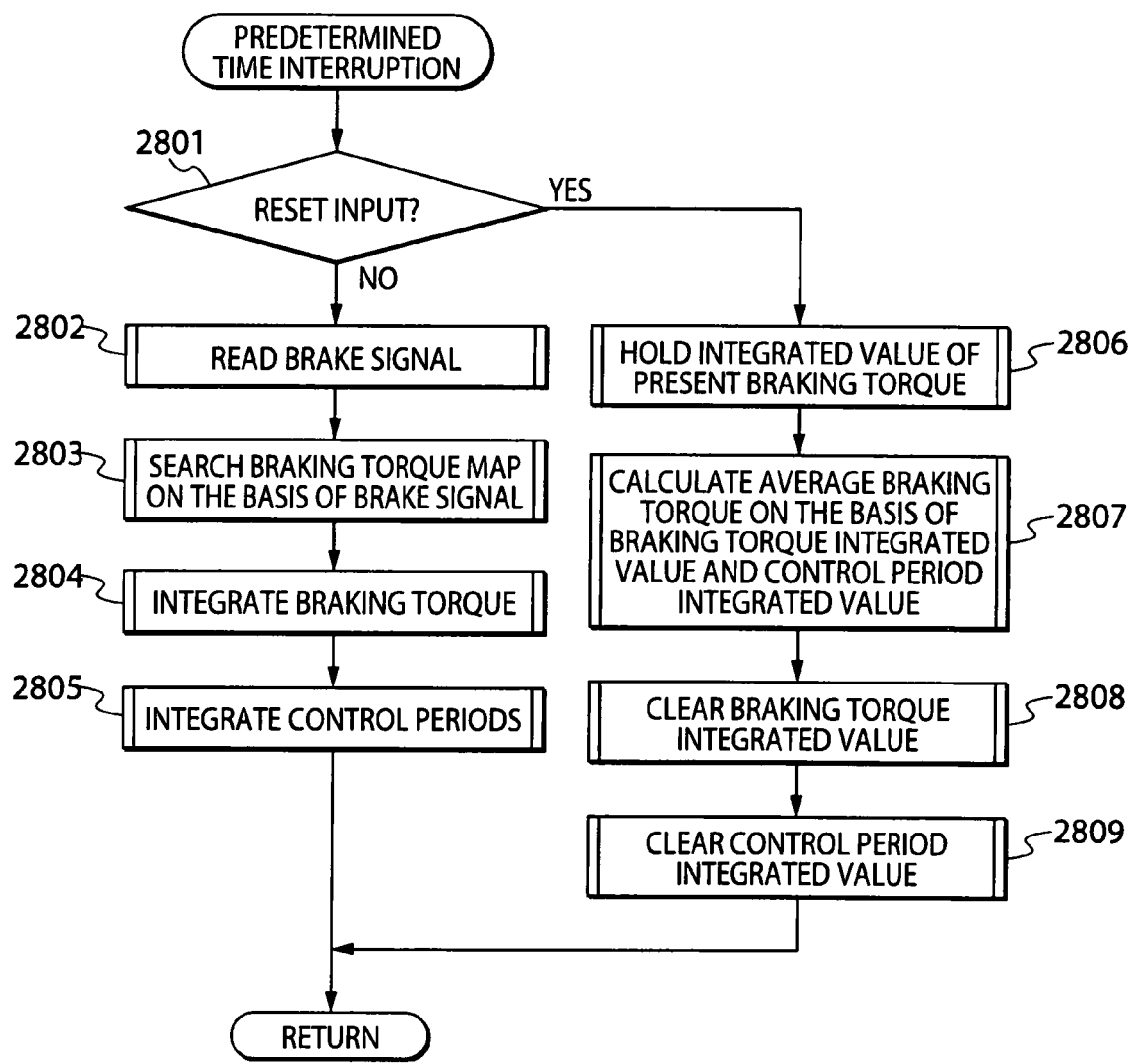
FIG. 28 is a flowchart showing operations of another braking force determining means in the engine controller of the embodiment.

FIG. 28 is a flowchart showing operations of the braking force determining section illustrated in FIG. 13, in the case where the interval producing section does not generate a trigger every predetermined time. The points different from the flowchart of FIG. 27 are that the following steps are added. In step 2805, control intervals are integrated. Time between the predetermined intervals is measured. On the basis of the measured time, average braking torque is computed in step 2807. In step 2809, the control interval integration value is cleared.

Figure 29:
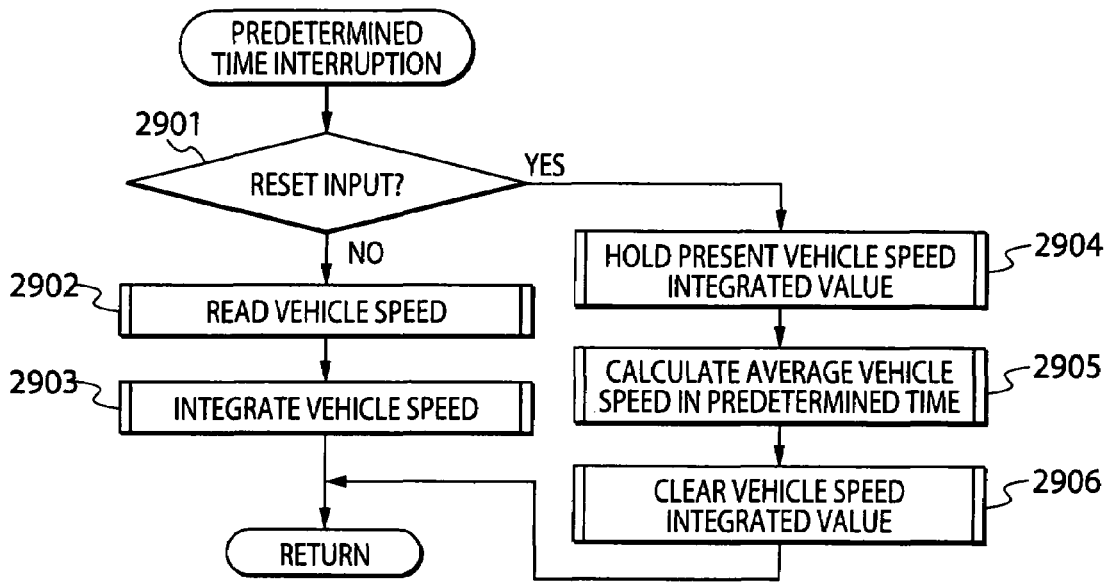
FIG. 29 is a flowchart showing operations of average vehicle speed computing means in the engine controller of the embodiment.

FIG. 29 is a flowchart showing operations of one of the average vehicle speed computing sections 704 and 804 in FIG. 14. In step 2901, whether a reset signal is input or not is determined. When the reset signal is not input, vehicle speed is read in step 2902, and the read vehicle speed is integrated in step 2903. When the reset signal is input, a present vehicle speed integrated value is held in step 2904. In step 2905, average vehicle speed in the predetermined time is calculated. In step 2906, a vehicle speed integrated value is cleared.

Figure 30:
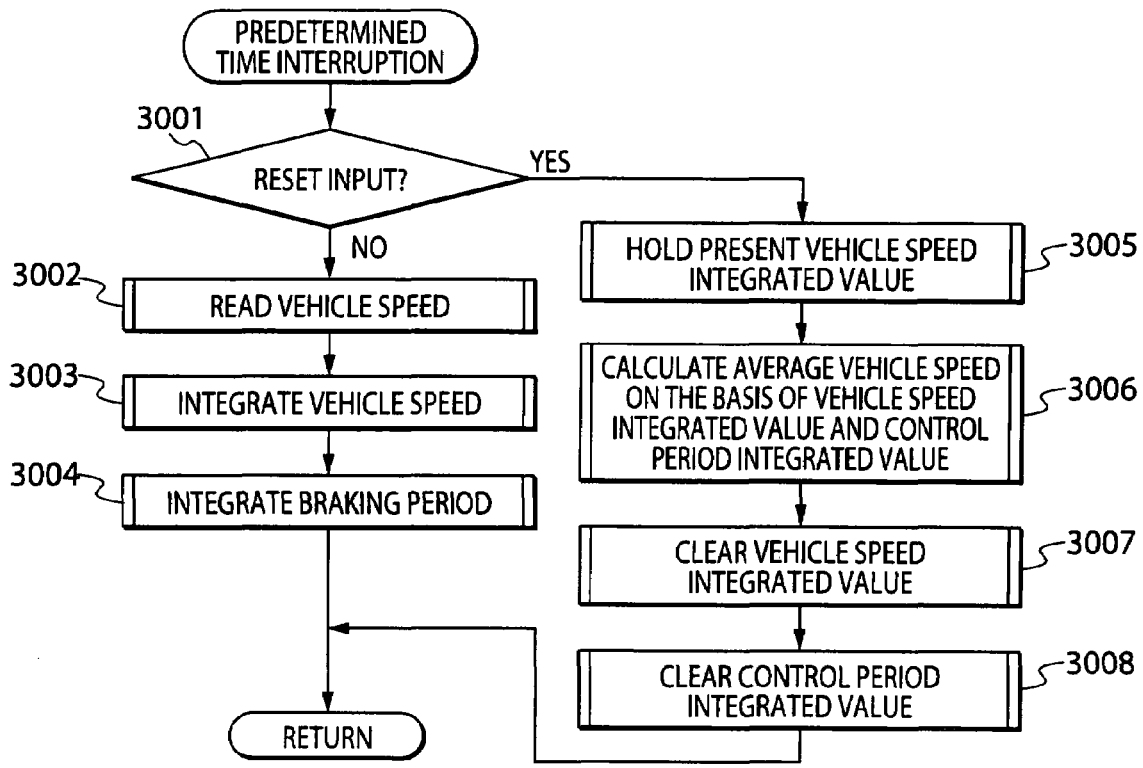
FIG. 30 is a flowchart showing control operations of another average vehicle speed computing means in the engine controller of the embodiment.

FIG. 30 is a flowchart showing operations of one of the average vehicle speed calculating sections 704 and 804 in FIG. 15, in the case where the interval producing section does not generate a trigger every predetermined time. The points different from FIG. 29 are that the following steps are added. In step 3004, control intervals are integrated, and time between predetermined intervals is measured. On the basis of the measured time, the average vehicle speed is calculated in step 3006. In step 3008, the control interval integrated value is cleared.

Figure 31:
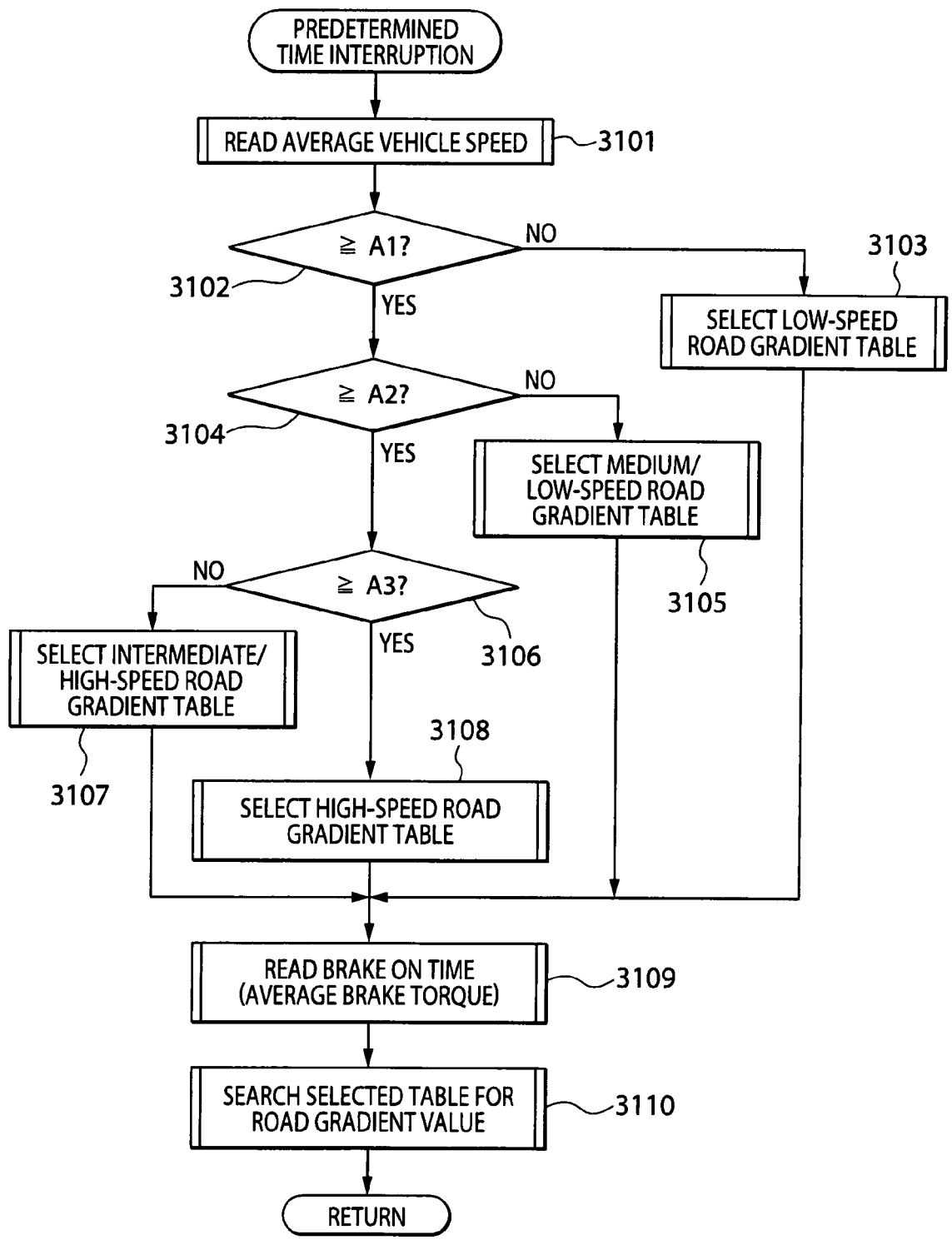
FIG. 31 is a flowchart showing operations of the road gradient determining means in the engine controller of the embodiment.

FIG. 31 is a flowchart showing operations of one of the road gradient determining sections 705 and 805 in FIG. 16. In step 3101, the average vehicle speed is read. In steps 3102, 3104, and 3106, the read average vehicle speed is compared with a threshold A1, a threshold A2, and a threshold A3, respectively. When the average vehicle speed is lower than the threshold A1, a low-speed road gradient table is selected in step 3103. When the case where the average vehicle speed is equal to or higher than the threshold A1 and is lower than the threshold A2, an intermediate/low-speed road gradient table is selected in step 3105. When the average vehicle speed is equal to or higher than the threshold A2 and is lower than the threshold A3, an intermediate/high-speed road gradient table is selected in step 3107. When the average vehicle speed is equal to or higher than the threshold A3, a high-speed road gradient table is selected in step 3108. A brake ON time (average brake torque) is read in step 3109, and a road gradient value is retrieved from the selected road gradient map on the basis of the brake ON time in step 3110.

Figure 32:
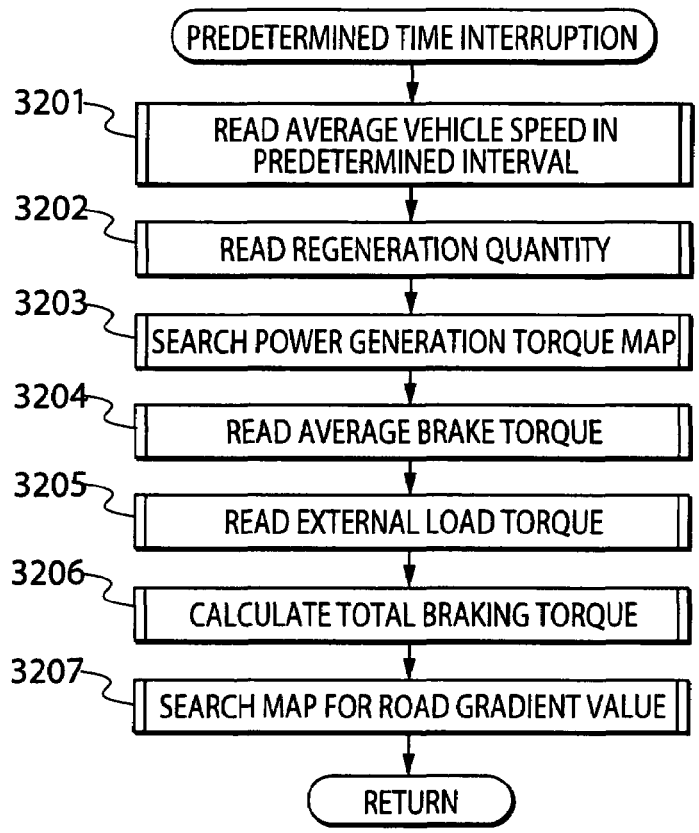
FIG. 32 is a flowchart showing operations of another road gradient determining means in the engine controller of the embodiment.

FIG. 32 is a flowchart showing operations of one of the road gradient determining sections 705 and 805 in FIG. 17. In step 3201, average vehicle speed in a predetermined interval is read. In step 3202, a regeneration quantity is read. In step 3203, a power torque as regeneration torque is retrieved from the map in relation to the basis of the read regeneration quantity. In step 3204, average brake torque is read. In step 3205, external load torque is read. In step 3206, the average brake torque, the external load torque, and the power generation torque are added, thereby computing total braking torque. In step 3207, the road gradient value is retrieved from the map in relation to the average vehicle speed and the total braking torque.

Figure 33:
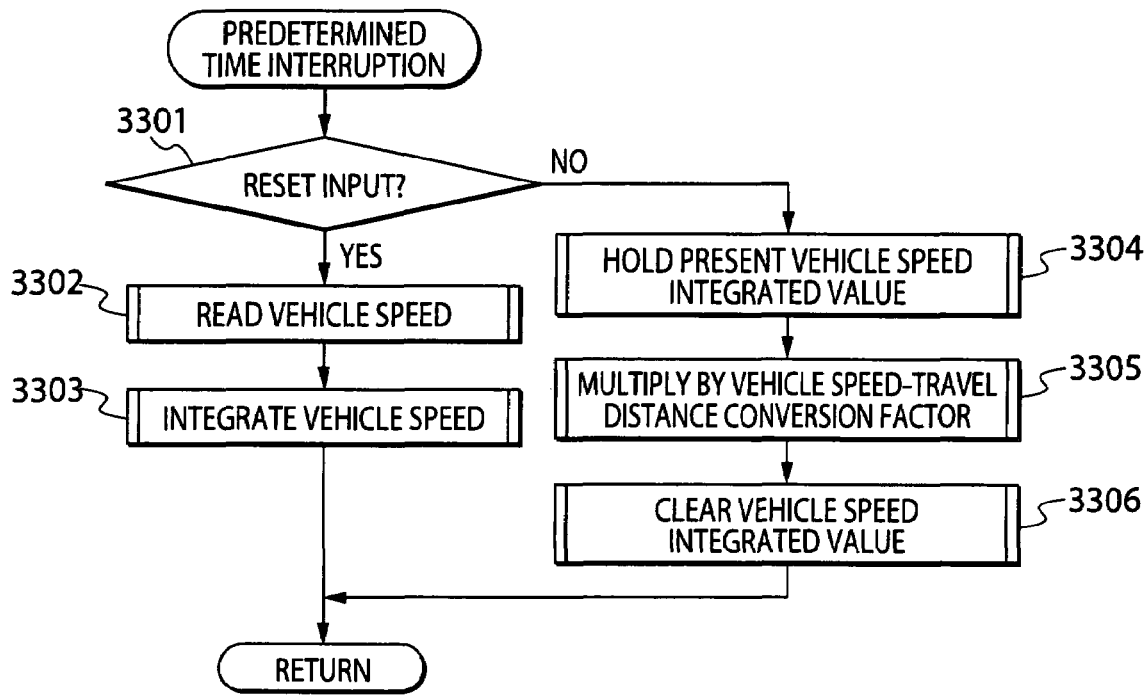
FIG. 33 is a flowchart showing operations of vehicle travel distance computing means in the engine controller of the embodiment.

FIG. 33 is a flowchart showing operations of one of the vehicle travel distance calculating sections 707 and 807 every predetermined time shown in FIG. 18. In step 3301, whether a reset signal is input or not is determined. When the reset signal is not input, vehicle speed is read in step 3302. In step 3303, the read vehicle speed is integrated. When the reset signal is input, in step 3304, a present vehicle speed integrated value is held and output. In step 3305, the vehicle speed integrated value is multiplied by a vehicle speed-travel distance conversion factor to calculate travel distance. In step 3306, a vehicle speed integrated value is cleared.

Figure 34:
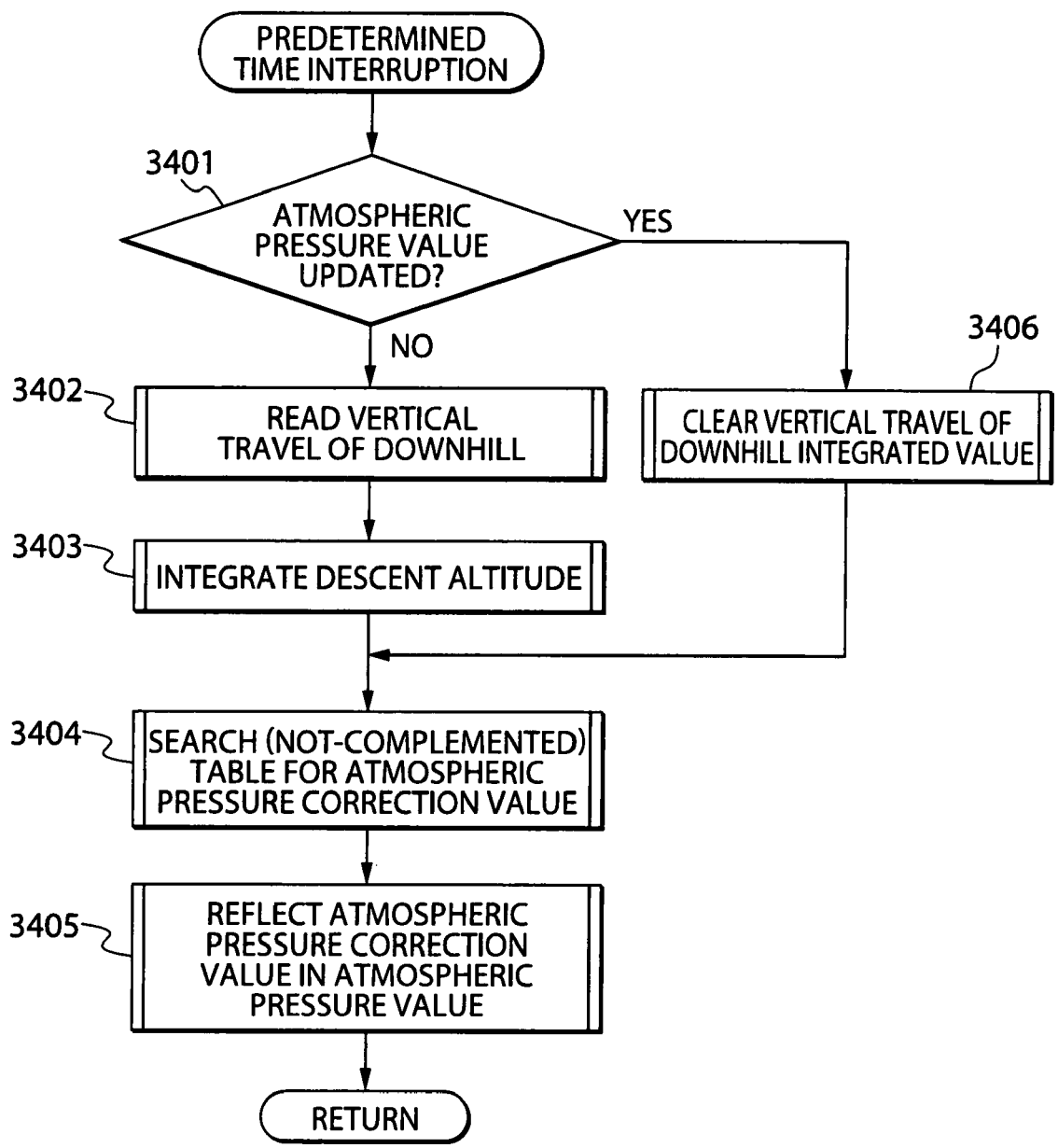
FIG. 34 is a flowchart showing operations of the atmospheric pressure correcting means in the engine controller of the embodiment.

FIG. 34 is a flowchart showing operations of the atmospheric pressure correcting sections 709 and 809 in FIG. 19. In step 3401, whether the atmospheric pressure value is updated or not is determined. In the case where the atmospheric pressure value is updated, the vehicle vertical travel of a downhill is read in step 3402. The vehicle vertical travel is integrated in step 3403. In step 3404, an atmospheric pressure correction value is retrieved from the map in relation to the integrated descent altitude. In step 3405, the atmospheric pressure correction value is reflected in the atmospheric pressure value. When the atmospheric pressure value is updated in step 3401, the vehicle vertical travel integrated value is cleared in step 3406.

Although an embodiment of the present invention has been described specifically above, the invention is not limited to the foregoing embodiment but can be variously changed in designing without departing from the spirits of the invention descried in the scope of the claims. For example, although the road gradient or the like is obtained from a map by the road gradient determining means or the like, the road gradient may be obtained by using a table. Although the atmospheric pressure correcting means obtains an atmospheric pressure correction value by a map search, the atmospheric pressure correction value may be obtained by computation.

According to the present invention, in an engine controller having no atmospheric pressure sensor, the atmospheric pressure value can be corrected during fuel cut of the engine on a long downhill. Consequently, the atmospheric pressure correction for the target throttle position of the electronic control throttle can be made according to the torque balance on the basis of an accelerator pedal, the motor generator, and the like. Thus, the driver can be prevented from feeling strangeness of acceleration or the like with respect to the accelerator position when the vehicle has moved from a high land to a low land and fuel cut is cancelled for the first time.

What is claimed is:

1. An engine controller for a vehicle comprising:
   a determining section for determining a state where an engine is not driven;
   a braking torque obtaining section for obtaining a braking toque acting on the vehicle;
   a vehicle speed sensing section for sensing a vehicle speed;
   an atmospheric pressure obtaining section for obtaining an atmospheric pressure value when an engine is driven;
   a road gradient obtaining section for obtaining a road gradient on the basis of the braking torque and the vehicle speed when the determining section determines the state where the vehicle is not driven;
   an atmospheric pressure correcting section which calculates a vehicle vertical travel of a downhill on the basis of the road gradient and a travel distance derived from the vehicle speed when the vehicle has descended the downhill, and corrects the atmospheric pressure value on the basis of the vehicle vertical travel of the downhill.

2. The engine controller according to claim 1,
   wherein the atmospheric pressure obtaining section obtains the atmospheric pressure on the basis of a pressure value within an intake pipe when pressures between upstream and downstream of a throttle valve in the intake pipe become the same.

3. The engine controller according to claim 1,
   wherein, in a case where a vehicle is driven only by an internal combustion engine, said determining section determines the state where the vehicle is not driven, by a fuel stop instruction to the engine.

4. The engine controller according to claim 1,
   Wherein, in a case where a vehicle is driven by an internal combustion engine and an electric motor, said determining section determines the state where the vehicle is not driven, by a fuel stop instruction to the engine and an output stop instruction to the electric motor.

5. The engine controller according to claim 1,
   wherein the braking torque obtaining section obtains the braking torque acting on the vehicle by an ON signal to a brake.

6. The engine controller according to claim 1,
   wherein the braking torque obtaining section obtains the braking torque acting on the vehicle by a mechanical force acting on a brake.

7. The engine controller according to claim 5,
   wherein the braking torque obtaining section obtains the braking torque acting on the vehicle by any of a combination of the quantity of power generated by a generator, an air conditioner compressor load, and an external load.

8. The engine controller according to claim 1,
   wherein inter-relations among an average vehicle speed, the braking torque, and the road gradient are predetermined, and the road gradient obtaining section obtains the road gradient in relation to the braking torque obtained by the braking torque obtaining section and the average vehicle speed obtained by the vehicle speed sensing section.

9. The engine controller according to claim 1,
   wherein a plurality of inter-relations between the braking torque and the road gradient are predetermined at different average vehicle speeds,
   the road gradient obtaining section selects one of the inter-relations between the braking torque and the road gradient in accordance with an average value of the vehicle speeds obtained by the vehicle speed sensing section, and obtains the road gradient from the braking torque obtained by the braking torque obtaining section, on the basis of the selected inter-relations.

10. The engine controller according to claim 1, wherein the atmospheric pressure correcting section has a function for obtaining a correction value for atmospheric pressure in a nonlinear form, in accordance with the calculated vehicle vertical travel of the downhill.

11. The engine controller according to claim 1, wherein the atmospheric pressure correcting section has a function for obtaining a correction value for atmospheric pressure in a linear form, in accordance with the calculated vehicle vertical travel of the downhill.

* * * * *